(12) United States Patent
Nakajima et al.

(10) Patent No.: US 10,968,334 B2
(45) Date of Patent: Apr. 6, 2021

(54) METHOD FOR MODIFYING STARCH AND METHOD FOR PRODUCING STARCH BLENDED PREPARATION

(75) Inventors: Toru Nakajima, Toyonaka (JP);
Makoto Nakauma, Toyonaka (JP);
Takahiro Funami, Toyonaka (JP)

(73) Assignee: SAN-EI GEN F.F.I., INC., Toyonaka (JP)

( * ) Notice: Subject to any disclaimer, the term of this patent is extended or adjusted under 35 U.S.C. 154(b) by 737 days.

(21) Appl. No.: 12/921,223

(22) PCT Filed: Mar. 6, 2009

(86) PCT No.: PCT/JP2009/054330
§ 371 (c)(1),
(2), (4) Date: Sep. 7, 2010

(87) PCT Pub. No.: WO2009/110610
PCT Pub. Date: Sep. 11, 2009

(65) Prior Publication Data
US 2011/0020530 A1    Jan. 27, 2011

(30) Foreign Application Priority Data

Mar. 7, 2008 (JP) .................................. 2008-058688

(51) Int. Cl.
*C08L 3/02* (2006.01)
*C08B 30/12* (2006.01)
(Continued)

(52) U.S. Cl.
CPC .............. *C08L 3/02* (2013.01); *A23C 9/137* (2013.01); *A23D 7/0053* (2013.01); *A23L 9/12* (2016.08);
(Continued)

(58) Field of Classification Search
USPC .............................. 426/661, 476; 127/71, 65
See application file for complete search history.

(56) References Cited

U.S. PATENT DOCUMENTS 5,362,329 A * 11/1994 Yoshino et al. ................. 127/65
5,489,340 A *  2/1996 Stute et al. ...................... 127/67
(Continued)

FOREIGN PATENT DOCUMENTS

JP          56-78572        6/1981
JP          4-130102        5/1992
(Continued)

OTHER PUBLICATIONS

International Search Report for International Application No. PCT/JP2009/054330 dated Mar. 25, 2009.

*Primary Examiner* — Amber R Orlando
*Assistant Examiner* — Stephanie A Cox
(74) *Attorney, Agent, or Firm* — Kratz, Quintos & Hansoru LLP

(57) ABSTRACT

The present invention provides a method of effectively modifying starch so as to have an inhibitory effect on swelling and disintegration equivalent to that of chemically-linked starch, without using chemicals or a large amount of water.

The method of modifying starch includes subjecting a powdery mixture containing starch and water-soluble hemicellulose at a ratio of 99.5:0.5 to 80:20 (weight ratio) to moist-heat treatment at 100 to 200° C.

18 Claims, 6 Drawing Sheets

(51) Int. Cl.
  *A23L 29/212*  (2016.01)
  *C08L 5/00*  (2006.01)
  *A23D 7/005*  (2006.01)
  *A23C 9/137*  (2006.01)
  *A23L 27/60*  (2016.01)
  *A23L 19/00*  (2016.01)
  *A23L 9/10*  (2016.01)

(52) U.S. Cl.
  CPC ............... *A23L 19/09* (2016.08); *A23L 27/60* (2016.08); *A23L 29/212* (2016.08); *C08B 30/12* (2013.01); *C08L 5/00* (2013.01)

(56) References Cited

U.S. PATENT DOCUMENTS

| | | | |
|---|---|---|---|
| 6,224,931 B1 * | 5/2001 | Narimatsu et al. | 426/451 |
| 2006/0204569 A1 * | 9/2006 | Obae et al. | 424/464 |

FOREIGN PATENT DOCUMENTS

| | | |
|---|---|---|
| JP | 6-145203 | 5/1994 |
| JP | 10-25304 | 1/1998 |
| JP | 2000-139387 | 5/2000 |
| JP | 2000-166491 | 6/2000 |
| JP | 2005-54028 A1 | 3/2005 |
| JP | 2005-171112 A1 | 6/2005 |
| JP | 2006-131772 A1 | 5/2006 |
| WO | WO 2008/143144 A1 | 11/2008 |
| WO | WO 2008143144 A1 * | 11/2008 |

* cited by examiner

METHOD FOR MODIFYING STARCH AND METHOD FOR PRODUCING STARCH BLENDED PREPARATION

TECHNICAL FIELD

The present invention relates to a method of modifying starch so that swelling and/or disintegration (i.e., rupture) of starch granules are efficiently suppressed without any chemical treatment. The present invention also relates to a method of producing a starch-blended preparation in which swelling and/or disintegration of starch granules are suppressed.

BACKGROUND ART

In the manufacture of food products, filling materials such as custard creams containing wheat flour and starch as the main ingredients are used in breads and confectionaries. When heated in the presence of a large amount of water, starch is swollen by the absorption of the surrounding water at a certain temperature range, thereby increasing viscosity. This phenomenon is called the "gelatinization" of starch. Because of this phenomenon, starch is widely used as a thickener or shape retainer for processed foods. However, natural, unmodified starch undergoes a phenomenon known as "breakdown"; that is, starch granules are disintegrated during gelatinization and subsequent stirring, and the original viscosity is barely maintained. This "breakdown" prominently occurs when the shear force during stirring is high or when the pH of the system is low, and therefore may become a problem during the production of processed food products.

For foods such as custard creams and jams, starch undergoing breakdown is unsuitable, and starch in which the viscosity reduction due to the disintegration of starch granules is suppressed is conventionally used. As such starches, distarch adipates and distarch phosphate etc., (referred to as chemically modified starch or processed starch) obtained by cross-linking glucose chains of starch through chemical reaction, are used.

In order to suppress the breakdown of starch, various attempts have been made to modify starch in combination with polysaccharide thickeners. Patent Document 1 proposes modifying starch by mixing xanthan gum with starch in powder form, adding thereto water to control the moisture, and heating the mixture at 100 to 200° C. for 30 minutes to 5 hours under dry conditions. Patent Document 2 discloses a method of producing modified starch, comprising mixing starch with raw soybean powder at a ratio of 0.1 to 20% with respect to the starch, and heating and aging the mixture at an initial moisture of 8% or higher. Additionally, the following methods have also been proposed: a method of producing moist-heat-treated starch, in which starch is put in a sealable container that is provided with both a vacuum line and a pressurized steam line and that is resistant to internal and external pressures, the pressure in the container is reduced, the starch is pressurized and heated by feeding steam to the container, and optionally this operation is repeated, thereby heating the starch for a predetermined time, after which the starch is cooled (Patent Document 3); a method of suppressing thermal swelling of starch by incorporating 0.1 to 10 mass % of organic acid salt in starch, followed by heating (Patent Document 4); and a method of producing denatured starch, comprising dispersing starch in an aqueous polar solvent containing 5 to 20 mass % of polar solvent and 15 to 30 mass % of water both based on the starch, and heating the dispersion at or above a gelatinization-starting temperature, but below 100° C. (Patent Document 5).

Patent Document 1: Japanese Unexamined Patent Publication No. 2005-54028
Patent Document 2: Japanese Unexamined Patent Publication No. 1981-78572
Patent Document 3: Japanese Unexamined Patent Publication No. 1992-130102
Patent Document 4: Japanese Unexamined Patent Publication No. 2005-171112
Patent Document 5: Japanese Unexamined Patent Publication No. 2006-131772

DISCLOSURE OF THE INVENTION

Problems to be Solved by the Invention

The method of Patent Document 1 has drawbacks in that moisture control is necessary, and the production process thereof is complicated. The method of Patent Document 2 has a low inhibitory effect on swelling and/or disintegration of target starch granules. The method of Patent Document 3 necessitates a special apparatus to carry it out. In the methods of Patent Documents 4 and 5, the use of salts, polar solvents and like components in starch may result in the deterioration of the flavor etc. of food products containing the starch, because these components can remain in the starch.

Accordingly, an object of the present invention is to provide a method of modifying starch so that at least either of swelling and disintegration of starch granules is suppressed, and preferably a method of modifying starch by suppressing coloring and smell as much as possible. Another object of the present invention is to provide a method of producing a starch-blended preparation in which at least either of swelling and disintegration of starch granules is suppressed, and to provide applications of food products using the starch-blended preparation.

The description "at least one of swelling and disintegration of starch granules is suppressed" means that embodiments of the present invention include all of the following cases: cases where only swelling of starch granules is suppressed; cases where only disintegration of starch granules is suppressed; and cases where both swelling and disintegration of starch granules are suppressed. The expression "swelling and/or disintegration" may be used in this sense below in the specification.

Means for Solving the Problems

The present inventors carried out intensive research to achieve the above objects, and found that a starch-blended preparation in which swelling and/or disintegration of starch granules are suppressed as in chemically treated cross-linked starch can be prepared by subjecting a mixture of starch and water-soluble hemicellulose to moist-heat treatment at a temperature of 50° C. or higher and lower than 100° C., and at a relative humidity of 50% or higher. However, performing moist-heat treatment at lower than 100° C. is very time-consuming. Hence, the inventors searched for a more efficient process, and found that a starch-blended preparation in which swelling and/or disintegration of starch granules are suppressed at a level almost equal to that of chemically treated starch can be prepared in a relatively short treatment time by subjecting a powdery mixture of starch and water-soluble hemicellulose at a specific proportion to moist-heat treatment at a temperature of 100 to 200° C., and that coloring, smell, and other problems do not remarkably occur in starch-blended preparations prepared under such conditions. The inventors also found that when tapioca starch, glutinous rice starch or waxy corn starch is used as a starch sauce, a higher effect can be obtained by incorporating sodium carbonate and like alkaline compounds, together with water-soluble hemicellulose, into the starch.

The present invention has been accomplished on the basis of these findings, and includes the following embodiments.

(I) Method of Modifying Starch (I-1) A method of modifying starch, comprising subjecting a powdery mixture containing starch and water-soluble hemicellulose at a ratio of 99.5:0.5 to 80:20 (weight ratio) to moist-heat treatment at 100 to 200° C.

(I-2) The modification method according to Item (I-1), wherein the moist-heat treatment is a heat treatment in the presence of steam.

(I-3) The modification method according to Item (I-1) or (I-2), wherein the moist-heat treatment is a treatment to heat the powdery mixture of starch and water-soluble hemicellulose in a closed container at a relative humidity of 100% for 5 to 300 minutes.

(I-4) The modification method according to Item (I-1) or (I-2), wherein the moist-heat treatment is a treatment to heat the powdery mixture of starch and water-soluble hemicellulose in an open container at a moisture content of 50 g/L to 1 kg/L for 5 to 60 minutes.

(I-5) The modification method according to any one of Items (I-1) to (I-4), wherein the starch is at least one member selected from the group consisting of potato starch, waxy potato starch, tapioca starch, glutinous rice starch, and waxy corn starch.

(I-6) The modification method according to any one of Items (I-1) to (I-4), wherein the starch is at least one member selected from the group consisting of tapioca starch, glutinous rice starch, and waxy corn starch; and the powdery mixture further contains an alkaline compound in addition to the starch and water-soluble hemicellulose.

(II) Method of Producing Starch-Blended Preparation (II-1) A method of producing a starch-blended preparation, comprising the steps of:
(1) mixing starch with water-soluble hemicellulose in powder form at a ratio of starch to water-soluble hemicellulose of 99.5:0.5 to 80:20 (weight ratio); and
(2) subjecting the powdery mixture to moist-heat treatment at 100 to 200° C.

(II-2) The production method according to Item (II-1), wherein the moist-heat treatment is a heat treatment in the presence of steam.

(II-3) The production method according to Item (II-1) or (II-2), wherein the moist-heat treatment is a treatment to heat the powdery mixture of starch and water-soluble hemicellulose in a closed container at a relative humidity of 100% for 5 to 300 minutes.

(II-4) The production method according to Item (II-1) or (II-2), wherein the moist-heat treatment is a treatment to heat the powdery mixture of starch and water-soluble hemicellulose in an open container at a moisture content of 50 g/L to 1 kg/L for 5 to 60 minutes.

(II-5) The production method according to any one of Items (II-1) to (II-4), wherein the starch is at least one member selected from the group consisting of potato starch, waxy potato starch, tapioca starch, and waxy corn starch.

(II-6) The production method according to any one of Items (II-1) to (II-4), wherein the starch is at least one member selected from the group consisting of tapioca starch, glutinous rice starch, and waxy corn starch; and the powdery mixture further contains an alkaline compound in addition to the starch and water-soluble hemicellulose.

(III) Starch-Blended Preparation (III-1) A starch-blended preparation produced by the method according to any one of Items (II-1) to (II-6).

(IV) Food Product (IV-1) A food product produced using the starch-blended preparation according to Item (III-1) as an ingredient.

Effect of the Invention

The method of the present invention does not necessitate complex moisture control, and allows the production of starch-blended preparations in which swelling and/or disintegration of starch granules are suppressed, in a relatively short treatment time while significantly suppressing the generation of coloring and smell during treatment. Accordingly, the starch-blended preparation produced by the method of the present invention can effectively be used as a thickener, shape retainer, or other food additive in food products such as custard creams, mayonnaise-type dressings, stirred-type yogurts, sauces, and soups in which swelling and/or disintegration of starch granules are unfavorable.

Further, the method of the present invention can easily optimize the inhibitory effect on swelling and/or disintegration of starch granules at a desired level by controlling the temperature and time for treating starch.

DESCRIPTION OF EMBODIMENT

Figure 1:
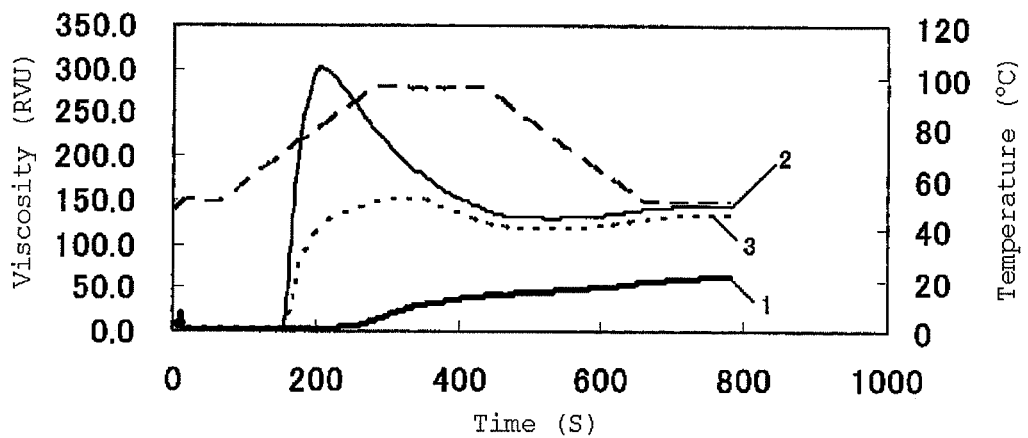
FIG. 1 shows the viscosity curves of the starch-blended preparations prepared in Example 1 (thick solid line: 1), Comparative Example 1 (thin solid line: 2), and Comparative Example 2 (dotted line: 3) measured by RVA (Rapid Visco Analyzer). A dashed line shows the temperature program during the RVA measurement (right longitudinal axis: ° C.) (hereinafter, the same applies to FIGS. 2 to 18).

The present invention uses starch that is not modified by heating or other treatment (a so-called native or raw starch) as a starting material. Generally distributed starch can be widely used. For example, any of corn starch, waxy corn starch, tapioca starch, rice starch, glutinous rice starch, potato starch, waxy potato starch, wheat starch, sweet potato starch, mung bean starch, kudzu starch, and sago starch can be used; potato starch, waxy potato starch, tapioca starch, glutinous rice starch, and waxy corn starch are preferred.

As the water-soluble hemicellulose used in the present invention, those that contain one or more of rhamnose, galactose, arabinose, xylose, glucose, and uronic acid, all of which are derived from soybeans, can be used; and those derived from cotyledons of soybeans are particularly preferred. The water-soluble hemicellulose used in the present invention may have an unlimited range of molecular weight. Generally, the average molecular weight of water-soluble hemicellulose is in the range of 100,000 to 1,000,000 g/mol, and those that have an average molecular weight within this range can be used.

The average molecular weight of water-soluble hemicellulose is determined by the intrinsic viscosity method using pullulan, whose molecular weight is already known (e.g., standard pullulan (P-500 (MW: 380,000), P-200 (MW: 180,000), P-100 (MW: 100,000), P-50 (MW: 48,000), P-20 (MW: 23,700), P-10 (MW: 12,200), and P-5 (MW: 5,800); products of Showa Denko K.K.) as a standard substance, and using a 0.1 M $NaNo_3$ aqueous solution as a solvent. Soybean hemicellulose is commercially available, and examples thereof include SM-1200 and SM-900 (produced by San-Ei Gen F.F.I., Inc.), Soya Five S-HR100 (produced by Fuji Oil Co. Ltd.), and the like.

Starch and water-soluble hemicellulose may be mixed in powder form. The proportion (weight ratio) of starch to water-soluble hemicellulose may be 99.5:0.5 to 80:20, and preferably 99:1 to 90:10, for example. When the proportion of water-soluble hemicellulose is low, the inhibitory effect on swelling and/or disintegration of starch granules tends to be reduced, and gelation of a starch-containing preparation after heat sterilization such as retort sterilization cannot sufficiently be suppressed. In contrast, when the proportion of water-soluble hemicellulose is too high, coloring and smell tend to occur in the resulting starch-blended preparations, and the color and flavor of food products to which such preparations are applied may be remarkably impaired.

When tapioca starch, glutinous rice starch or waxy corn starch is used as a starch source, an alkaline compound can be mixed in addition to the above-mentioned water-soluble hemicellulose. Compounds that become alkaline when dissolved in water are used as such alkaline compounds, and specific examples thereof include hydroxides, carbonates, hydrogen carbonates, and organic acid salts of alkali metals such as sodium and potassium; hydroxides, carbonates, hydrogen carbonates, organic acid salts of alkaline earth metals such as calcium and magnesium; and the like. Examples of organic acids include citric acid, tartaric acid, malic acid, succinic acid, gluconic acid, fumaric acid, acetic acid, and oxalic acid. Carbonates or hydrogen carbonates of alkali metals are preferred, and carbonates of alkali metals are more preferred.

When such an alkaline compound is incorporated into starch, its proportion (weight ratio) to the starch (tapioca starch, glutinous rice starch or waxy corn starch) is, for example, 0.01 to 0.5 parts by weight, preferably 0.02 to 0.2 parts by weight, and more preferably 0.1 to 0.2 parts by weight, with respect to 100 parts by weight of starch.

The combined use of an alkaline compound can enhance the inhibitory effect on swelling and/or disintegration of starch granules achieved by subjecting a powdery mixture of starch (tapioca starch, glutinous rice starch or waxy corn starch) and water-soluble hemicellulose to moist-heat treatment.

When tapioca starch, glutinous rice starch or waxy corn starch is used as a starch source in the mixture of starch and water-soluble hemicellulose in powder form at the ratio described above, an alkaline compound is further mixed therewith, if necessary, and then the mixture is subjected to moist-heat treatment.

Moist-heat treatment can be carried out by heating the powdery mixture of starch and water-soluble hemicellulose (or the powdery mixture of starch, water-soluble hemicellulose and an alkaline compound) in the presence of steam at a temperature of 100° C. or higher, and preferably 100 to 200° C.

Moist-heat treatment can also be carried out using a pressurizing and heating apparatus, such as a commercially available autoclave (e.g., SX-500; produced by Tomy Seiko Co., Ltd.), or performed by heating the powdery mixture in an apparatus such as a fluid bed granulation dryer or hybrid kiln (e.g., a product of Nisshin Engineering Inc.) in combination with steam, superheated steam, water spray, etc. Moist-heat treatment can also be performed by heating the powdery mixture in an incubator (i.e., constant temperature and humidity bath) at a desired temperature and humidity.

An autoclave is one form of what is called a pressure vessel or pressurized steam vessel, and is an apparatus that can raise the steam temperature to 100° C. or higher while maintaining the internal pressure by heating water while controlling an exhaust valve in an airtight container. An autoclave can be used for pressure heat sterilization or hydrothermal synthesis; when used for pressure heat sterilization, it allows for treatment at an atmospheric pressure of up to 4 atms and at a temperature of up to about 130° C.; and when used for hydrothermal synthesis, it allows for treatment at hundreds of atmospheres and at a temperature of up to about 300° C. The relative humidity in an autoclave vessel is 100%.

That is, the moist-heat treatment as used in the present invention includes a method of heating a powdery mixture of starch and water-soluble hemicellulose (or a powdery mixture of starch, water-soluble hemicellulose and an alkaline compound) in a closed container at a relative humidity of 100% and a temperature of 100° C. or higher, preferably 100 to 200° C.

A hybrid kiln is a rotary-type apparatus using an external heating system by induction heating (IH) in combination with an internal heating system by superheated steam, and can perform moist-heat treatment by supplying a sample to a kiln and then blowing saturated or superheated steam into the kiln while heating. Saturated steam can be used to carry out heating treatment at about 100° C., and superheated steam can be used to carry out heating treatment at about 105 to 400° C. Since such a hybrid kiln is an open system, it is always necessary to supply steam during heating time (the pressure in the kiln is atmospheric pressure (1 atm)). The amount of steam is determined by the temperature of steam supplied, the linear velocity of the steam flow, and the heating time. In fact, the amount of steam supplied is calculated from the amount of water consumed by a vapor generator.

An incubator (i.e., constant temperature and humidity bath) is a thermal treatment apparatus that can control the humidity and temperature at a constant level in such a manner that the inside of a normal pressure open-system treatment bath is heated by a heater while water is heated by another heater, then steam is blown into the bath to generate an atmosphere in which the relative humidity is 100% in the bath; in this state, the steam is discharged from the bath by an exhaust fan, as appropriate. In such an incubator, the temperature and relative humidity can be controlled at levels that have been determined by automatic calculation by means of a wet-bulb thermometer or dry-bulb thermometer. Since the inside of such an incubator is an open system, it is always necessary to supply steam during heating time (the pressure in the bath is atmospheric pressure (1 atm)). The amount of steam is determined by the relative humidity and temperature set in the bath, and the treatment time. In fact, the amount of steam supplied is calculated from the amount of water supplied to the incubator, as in the hybrid kiln.

The moist-heat treatment as used in the present invention includes a method of heating the above-mentioned powdery mixture of starch and water-soluble hemicellulose (or the powdery mixture of starch, water-soluble hemicellulose and an alkaline compound) in an open container such as a hybrid kiln or an incubator, as described above, under conditions where the steam amount in the container is 50 g/L to 1 kg/L, and preferably 70 g/L to 1 kg/L, at a temperature of 100° C. or higher, and preferably 100 to 200° C., for 5 to 60 minutes.

The time of the moist-heat treatment is not limited. Although the time varies depending on the proportion of starch to water-soluble hemicellulose, when the treatment is carried out using, for example, an autoclave, the time is usually 5 to 300 minutes, and preferably 10 to 300 minutes; when the treatment is carried out using a hybrid kiln, the time is usually 5 to 60 minutes, and preferably 5 to 15 minutes; and when the treatment is carried out using an incubator, the time is usually 5 to 60 minutes, and preferably 5 to 15 minutes.

Thus, the method of the present invention can significantly shorten the treatment time compared to conventional moist-heat treatment. The treatment time may suitably be optimized depending on the degree of moist-heat treatment necessary for the modification of starch, or depending on the apparatus to be used, such as an autoclave, hybrid kiln or incubator.

Thus, starch is modified so that swelling and/or disintegration of starch granules are suppressed, and further a starch-blended preparation Lhat is modified so that swelling and/or disintegration of starch granules are suppressed can be produced.

The modified starch and starch-blended preparation prepared in the above manner can suitably be used as a substitute for raw starch in the preparation of custard creams, mayonnaise-type dressings, stirred-type yogurts, soups and sauces as a thickener or shape retainer for the purposes of enhancing heat resistance, stirring resistance and acid resistance as well as improving the texture, all of which are inferior in raw starch.

INDUSTRIAL APPLICABILITY

The method of the present invention allows the production of modified starch or starch-blended preparations in which swelling and/or disintegration of starch granules are suppressed, using native starch (raw starch) as a starting material. The use of such modified starch or starch-blended preparations can provide custard creams, mayonnaise-type dressings, stirred-type yogurts, and the like that do not undergo undesirable degradation in viscosity.

EXAMPLES

The present invention is described below with reference to Experimental Examples and Examples; however, the invention is not limited thereto. Unless otherwise specified, "part" denotes "part by weight", and "%" denotes "weight %".

The following starting materials were used in Experimental Examples.

Potato starch: "Bunkyu SH shita" (trade name) (produced by JA-Shari) (This is a small-granule potato starch)

Waxy potato starch: "ELIAN100" (trade name) (produced by AVEBE)

Waxy corn starch: "Waxy starch W" (trade name) (produced by Sanwa Cornstarch Co., Ltd.)

Tapioca starch: made in Thailand

Water-soluble hemicellulose: "Soya Five S-HR100" (trade name) (produced by Fuji Oil Co., Ltd.), "SM-1200" (trade name) (produced by San-Ei Gen F.F.I., Inc.)

Microcrystalline cellulose: "Ceolus RC-591" (trade name) (produced by Asahi Kasei Chemicals Corporation)

Raw soybean powder: "Pro Plus-C" (trade name) (produced by Fuji Oil Co., Ltd.)

Xanthan gum: "Keltrol" (trade name) (produced by CP Kelco)

(I) Evaluation 1

Evaluation of Starch-Blended Preparation Processed by Moist-Heat Treatment (Inhibitory Effect on Swelling and/or Disintegration)

Experimental Example 1

Effect of Moist-Heat Treatment (1) Preparation of Starch-Blended Preparation

Starch (potato starch) and water-soluble hemicellulose (SM-1200) were mixed at the ratios shown in Table 1. The mixture of Example 1 was subjected to moist-heat treatment using an autoclave under the conditions described below (relative humidity in the autoclave: 100%). Table 1 shows the formulation of each starch-blended preparation and conditions for moist-heat treatment.

<RVA Conditions>
Starch concentration: 4.8 W/W % (total weight: 25 g)
Temperature program: see Table 2
Stirring rate: 160 rpm (960 rpm only for the first 10 seconds)
Viscosity unit: RVU (RVA Unit)

TABLE 2

| Temperature | Condition | Time |
|---|---|---|
| 50° C.-50° C. | Holding | 60 sec. |
| 50° C.-95° C. | Heating | 222 sec. |
| 95° C.-95° C. | Holding | 150 sec. |
| 95° C.-50° C. | Cooling | 118 sec. |
| 50° C.-50° C. | Holding | 120 sec. |

FIG. 1 shows the results (Example 1: thick solid line (Symbol 1), Comparative Example 1: thin solid line (Symbol 2), and Comparative Example 2: dotted line (Symbol 3).

When heated in the presence of a large amount of water, starch (Comparative Example 1) generally starts swelling as a result of the water absorption at a certain temperature. The swelling of starch is detected as the upstroke of a viscosity curve in RVA measurement. Thereafter, the viscosity increases in accordance with the swelling of starch granules upon heating, and the viscosity curve indicates a peak. The sufficiently swelled starch granules then start disintegrating. The disintegration of the starch granules is detected as the downstroke (breakdown) of the viscosity curve in RVA measurement. The thin solid line represented by Symbol 2 in FIG. 1 reflects the phenomena of swelling and disintegration of the starch (100% potato starch: Comparative Example 1).

In contrast, as for chemically-linked starch ebtained by chemically treating raw starch, swelling and disintegration of starch granules are suppressed as the degree of chemically-linking is higher. Therefore, such starch is known to

TABLE 1

| | Starch | | Ratio of water- | Treatment | | | Evaluation of |
|---|---|---|---|---|---|---|---|
| | Type | Ratio (%) | soluble hemicellulose (%) | Temperature (° C.) | time (minutes) | Treatment apparatus | swelling/disintegration inhibition |
| Ex. 1 (thick solid line) | Potato starch | 99 | 1 | 120 | 10 | Autoclave | +++ |
| Comp. Ex. 1 (thin solid line) | Potato starch | 100 | Not added | | | Untreated | ± |
| Comp. Ex. 2 (dotted line) | Potato starch | 99 | 1 | | | Untreated | + |

(2) Inhibitory Effect of Each Starch-Blended Preparation on Swelling and/or Disintegration Subsequently, the obtained starch-blended preparations were examined for the inhibitory effect on swelling and/or disintegration of starch granules using an RVA (Rapid Visco Analyzer) apparatus produced by New Port Scientific. An RVA is an apparatus that can continuously measure the viscosity of a test sample while heating and cooling the sample at a programmed temperature and stirring rate (number of revolutions). The starch-blended preparations prepared above were processed by RVA to measure the viscosity with time under the following conditions.

show a late upstroke (i.e., higher swelling temperature) in its viscosity curve, or to have an ever-increasing curve with and no peaks in the viscosity curve or curve indicating a completely low viscosity in RVA measurement.

On the basis of the viscosity curve of starch in RVA measurement, the starch-blended preparation (Example 1) prepared above was evaluated with respect to whether swelling and/or disintegration of starch granules were suppressed, from the results shown in FIG. 1.

In the results, as illustrated by the dotted line (Symbol 3) in FIG. 1, when potato starch was only mixed with water-soluble hemicellulose in powder form without any heating treatment (Comparative Example 2), the viscosity curve showed a late upstroke and decreased breakdown, indicating the suppression of swelling and disintegration of starch granules. When the mixture was further subjected to moist-heat treatment (Example 1; thick solid line (Symbol 1)), viscosity changes, associated with swelling and disintegration of the starch granules, were remarkably suppressed. This made it clear that swelling and disintegration of starch granules were remarkably suppressed by subjecting a mixture of potato starch and water-soluble hemicellulose to moist-heat treatment.

Table 1 shows the evaluation results, showing the inhibitory effect of each starch-blended preparation on swelling and disintegration of starch granules (Example 1 and Comparative Example 2) in accordance with the following criteria. The inhibitory effect on swelling and disintegration was evaluated on the basis of the viscosity curve obtained in each experiment, or by microscope observation. The swelling and disintegration inhibitory effect of the preparation of Comparative Example 1, which comprises 100% potato starch, was used as the control (the same criteria were used in the evaluation of Experimental Examples 2 and 4 to 9).

Each symbol represents the inhibitory effects described below.

±: Control

For the suppression of swelling and disintegration of starch granules:

+++: remarkably effective

++: effective

+: slightly effective

−: ineffective

Experimental Example 2

Relationship Between Proportion of Starch to Water-Soluble Hemicellulose, and Inhibitory Effect on Swelling and/or Disintegration of Starch Granules In order to examine the relationship between the proportion of starch to water-soluble hemicellulose (SM-1200) and the inhibitory effect on swelling and/or disintegration of starch granules, various starch-blended preparations were prepared according to the formulations shown in Table 3 using an autoclave (relative humidity: 100%), and RVA measurement was performed in the same manner as in Experimental Example 1 to evaluate the inhibitory effect of each preparation on swelling and/or disintegration of starch granules.

TABLE 3

| | Starch | | Ratio of water-soluble hemicellulose | Temperature | Treatment time | Treatment | Evaluation of swelling/disintegration |
|---|---|---|---|---|---|---|---|
| | Type | Ratio (%) | (%) | (° C.) | (minutes) | apparatus | inhibition |
| Ex. 1 (thick solid line) | Potato starch | 99 | 1 | 120 | 10 | Autoclave | ++ |
| Ex. 2 (thick dashed line) | Potato starch | 95 | 5 | 120 | 10 | Autoclave | +++ |
| Ex. 3 (single-dashed line) | Potato starch | 90 | 10 | 120 | 10 | Autoclave | +++ |
| Ex. 4 (double-dashed line) | Potato starch | 80 | 20 | 120 | 10 | Autoclave | +++ |
| Comp. Ex. 3 (thin solid line) | Potato starch | 99.75 | 0.25 | 120 | 10 | Autoclave | + |
| Comp. Ex. 4 (thick dotted line) | Potato starch | 100 | Not mixed | 120 | 10 | Autoclave | + |
| Comp. Ex. 5 (dashed line) | Potato starch | 75 | 30 | 120 | 10 | Autoclave | +++ Coloration and smell |

Figure 2:
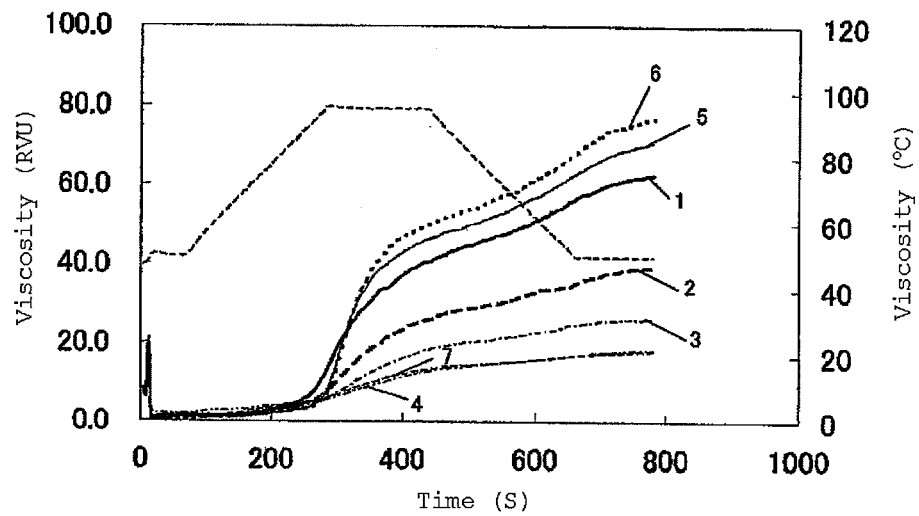
FIG. 2 shows the viscosity curves of the starch-blended preparations prepared in Example 1 (thick solid line: 1), Example 2 (thick dashed line: 2), Example 3 (single-dashed line: 3), Example 4 (double-dashed line: 4), Comparative Example 3 (thin solid line: 5), Comparative Example 4 (thick dotted line: 6), and Comparative Example 5 (dashed line: 7) measured by RVA.

FIG. 2 shows the viscosity curves of starch-blended preparations prepared by mixing potato starch with water-soluble hemicellulose at a ratio of 99:1 to 80:20, and then subjecting the mixture to moist-heat treatment (100% in relative humidity) using an autoclave at 120° C. for 10 minutes under the saturated vapor pressure (Example 1 (thick solid line: 1), Example 2 (thick dashed line: 2), Example 3 (single-dotted line: 3), and Example 4 (double-dotted line: 4)). For the purpose of comparison, a preparation consisting of 100% potato starch (Comparative Example 4), a preparation prepared by mixing potato starch with water-soluble hemicellulose at a ratio of 99.75:0.25 (Comparative Example 3 (thin solid line: 5)), and a preparation prepared by mixing potato starch with water-soluble hemicellulose at a ratio of 70:30 (Comparative Example 5) were each subjected to autoclave treatment under the same conditions as above. FIG. 2 also shows the viscosity curves of the preparations prepared in Comparative Examples 4 and 5 (Comparative Example 4 (thick dotted line 6) and Comparative Example 5 (dashed line: 7)).

As is clear from FIG. 2, the viscosity of each starch-blended preparation was reduced as the proportion of water-soluble hemicellulose increased from 0 to 20%; viscosity changes were suppressed, as well. This indicated that both swelling and disintegration of starch granules were suppressed. The results also suggested the possibility of controlling the viscosity of the resulting starch-blended preparations by adjusting the proportion of starch to water-soluble hemicellulose. In contrast, when the proportion of starch was 100% (in the absence of water-soluble hemicellulose) as in Comparative Examples 1 and 4, and the proportion of water-soluble hemicellulose was small (Comparative Example 3), the reduction in viscosity was insufficient.

On the other hand, when the proportion of water-soluble hemicellulose was 30% (Comparative Example 5), the viscosity changes were almost the same as in Example 4 in which the proportion of water-soluble hemicellulose was 20%. Their viscosity curves were also almost similar to each other, showing a good inhibitory effect on swelling and/or disintegration. However, the starch-blended preparation of Comparative Example 5 underwent remarkable coloring and had a remarkable soybean smell after moist-heat treatment, and was not regarded as a practical preparation (see Evaluation 3).

Experimental Example 3

Relationship Between Type of Starch and Inhibitory Effect on Swelling and/or Disintegration In order to examine the relationship between the type of starch used and inhibitory effect on the swelling and/or disintegration of starch granules, various starch-blended preparations were prepared according to the formulations shown in Table 4 using potato starch (Example 1 and Comparative Example 1), waxy potato starch (Example 5 and Comparative Example 6), tapioca starch (Example 6 and Comparative Example 7), and waxy corn starch (Example 7 and Comparative Example 8), as starch sources. The autoclave conditions (moist-heat treatment conditions) were the same as those in Experimental Example 1. These starch-blended preparations were subjected to the RVA measurement in the same manner as in Experimental Example 1 to evaluate the inhibitory effect of each preparation on swelling and/or disintegration of starch granules. Experimental Examples 1, 5, 6 and 7 were evaluated using comparative Examples 1, 6, 7 and 8 as the controls, respectively, to confirm the inhibitory effect on the swelling and disintegration of the starch granules. Each symbol represents the inhibitory effects described below.

±: Control

For the suppression of swelling and disintegration of starch granules:
+++: remarkably effective
++: effective
+: slightly effective
−: ineffective

TABLE 4

| | Starch | | Ratio of water-soluble hemicellulose (%) | Treatment Temperature (° C.) | Treatment time (minutes) | Treatment apparatus | Evaluation of swelling/disintegration inhibition |
|---|---|---|---|---|---|---|---|
| | Type | Ratio (%) | | | | | |
| Ex. 1 | Potato starch | 99 | 1 | 120 | 10 | Autoclave | +++ |
| Ex. 5 | Waxy potato starch | 99 | 1 | 120 | 10 | Autoclave | +++ |
| Ex. 6 | Tapioca starch | 99 | 1 | 120 | 10 | Autoclave | ++ |
| Ex. 7 | Waxy corn starch | 99 | 1 | 120 | 10 | Autoclave | ++ |
| Comp. Ex. 1 | Potato starch | 100 | Not mixed | | | Untreated | ± |
| Comp. Ex. 6 | Waxy potato starch | 100 | Not mixed | | | Untreated | ± |
| Comp. Ex. 7 | Tapioca starch | 100 | Not mixed | | | Untreated | ± |
| Comp. Ex. 8 | Waxy corn starch | 100 | Not mixed | | | Untreated | ± |

* As water-soluble hemicellulose, SM-1200 was used for the potato starch, and Soya Five S-HR100 was used for the other starches.

Figure 3:
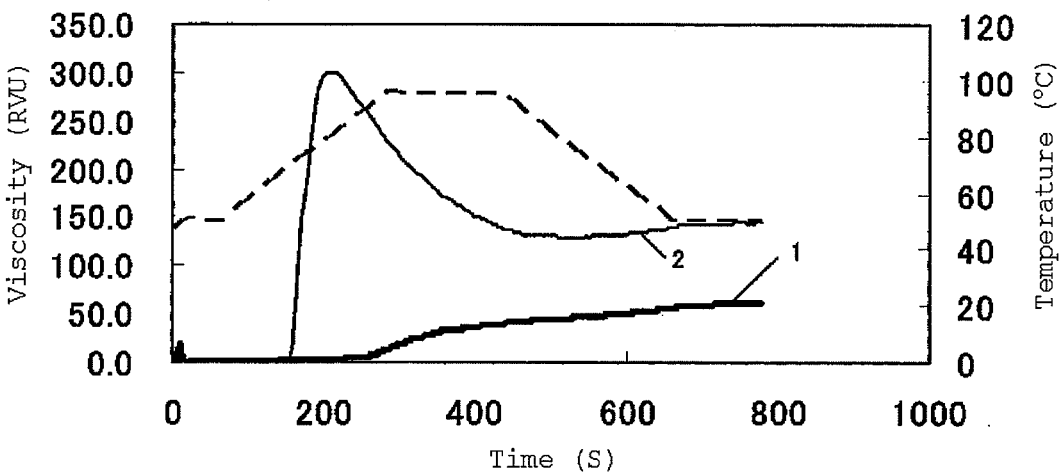
FIG. 3 shows the viscosity curves of the starch-blended preparations prepared in Example 1 (thick solid line: 1) and Comparative Example 1 (thin solid line: 2) measured by RVA.

FIG. 3 shows the viscosity curves of untreated potato starch (Comparative Example 1 (thin solid line: 2)) and a starch-blended preparation prepared by mixing potato starch with water-soluble hemicellulose at a ratio of 99:1 and subjecting the mixture to moist-heat treatment using an autoclave (Example 1 (thick solid line: 1), obtained from the RVA measurement. Compared with the potato starch (Comparative Example 1), which was the starting material, the starch-blended preparation (Example 1) prepared by mixing potato starch with water-soluble hemicellulose, followed by moist-heat treatment showed suppressed upstroke and breakdown of the viscosity curve, and indicated few changes in viscosity. This confirmed that swelling and disintegration of starch granules were significantly suppressed.

Figure 4:
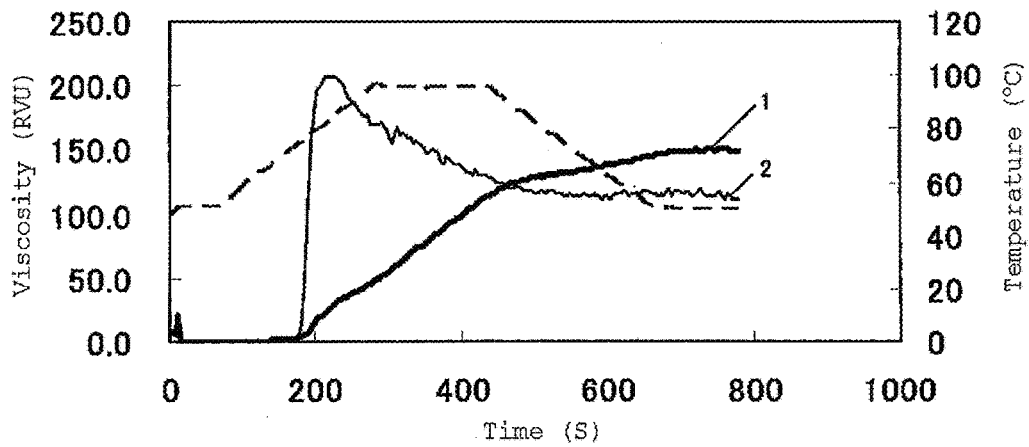
FIG. 4 shows the viscosity curves of the starch-blended preparations prepared in Example 5 (thick solid line: 1) and Comparative Example 6 (thin solid line: 2) measured by RVA.

FIG. 4 shows the viscosity curves of untreated waxy potato starch (Comparative Example 6 (thin solid line: 2)) and a starch-blended preparation prepared by mixing waxy potato starch with water-soluble hemicellulose at a ratio of 99:1, and subjecting the mixture to moist-heat treatment using an autoclave (Example 5 (thick solid line: 1)). Compared with the waxy potato starch (Comparative Example 6: Symbol 2), which was the starting material, the starch-blended preparation prepared by mixing waxy potato starch with water-soluble hemicellulose, followed by moist-heat treatment showed suppressed upstroke of the viscosity curve (i.e., higher swelling temperature) as well as no decrease in viscosity from the peak in the curve (elimination of breakdown). This suggests that swelling and disintegration of starch granules were suppressed. Thus, the starch-blended preparation of the present invention (Example 5) exhibited an inhibitory effect on swelling and/or disintegration.

Figure 5:
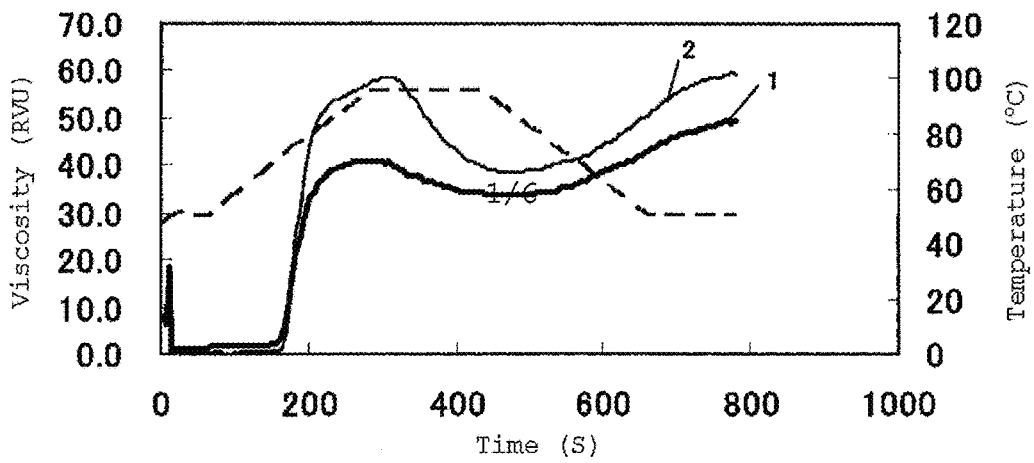
FIG. 5 shows the viscosity curves of the starch-blended preparations prepared in Example 6 (thick solid line: 1) and Comparative Example 7 (thin solid line: 2) measured by RVA.

FIG. 5 shows the viscosity curves of untreated tapioca starch (Comparative Example 7 (thin solid line: 2)) and a starch-blended preparation prepared by mixing tapioca starch with water-soluble hemicellulose at a ratio of 99:1, and subjecting the mixture to moist-heat treatment using an autoclave (Example 6 (thick solid line: 1)), obtained by the RVA measurement. Compared with the tapioca starch (Comparative Example 7), which was the starting material, the starch-blended preparation prepared by mixing tapioca starch with water-soluble hemicellulose followed by moist-heat treatment showed suppressed upstroke of the viscosity curve (i.e., higher swelling temperature) as well as less degradation from the peak of viscosity curve (elimination of breakdown), indicating that swelling and disintegration of starch granules were suppressed.

Figure 6:
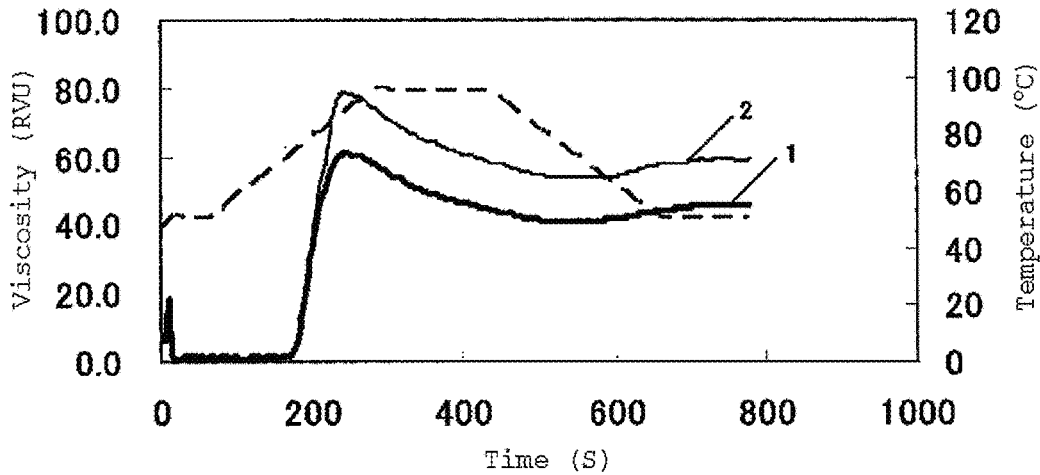
FIG. 6 shows the viscosity curves of the starch-blended preparations prepared in Example 7 (thick solid line: 1) and Comparative Example 8 (thin solid line: 2) measured by RVA.

FIG. 6 shows the viscosity curves of untreated waxy corn starch (Comparative Example 8 (thin solid line: 2)) and a starch-blended preparation prepared by mixing waxy corn starch with water-soluble hemicellulose at a ratio of 99:1, and subjecting the mixture to moist-heat treatment for 10 minutes at 120° C. using an autoclave (Example 7 (thick solid line: 1)), obtained from the RVA measurement. Compared with the waxy corn starch (Comparative Example 8: Symbol 2), which was the starting material, the starch-blended preparation prepared by mixing waxy corn starch with water-soluble hemicellulose, followed by moist-heat treatment showed somewhat suppressed upstroke of the viscosity curve (viscosity enhancement) and less degradation from the peak of viscosity curve (elimination of breakdown), indicating that swelling and disintegration of starch granules were suppressed.

Experimental Example 4

Effect of Polysaccharide Other than Water-Soluble Hemicellulose

Figure 7:
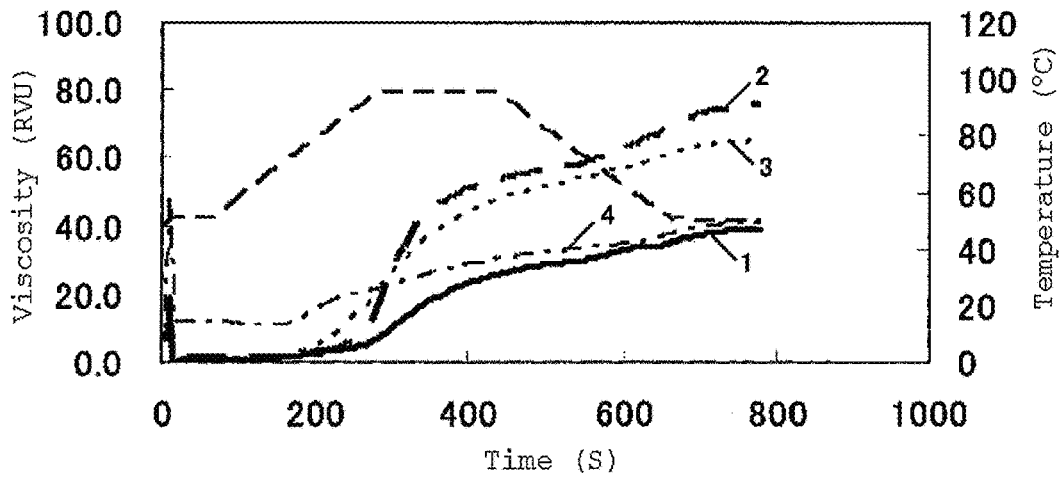
FIG. 7 shows the viscosity curves of the starch-blended preparations prepared in Example 2 (thick solid line: 1), Comparative Example 9 (thick dashed line: 2), Comparative Example 10 (dotted line: 3), and Comparative Example 11 (single-dashed line: 4) measured by RVA.

In order to confirm the swelling and/or disintegration inhibitory effects of starch-blended preparations prepared using polysaccharides (soybean flour, microcrystalline cellulose and xanthan gum) other than water-soluble hemicellulose, various starch-blended preparations were prepared according to the formulations shown in Table 5. The autoclave conditions (moist-heat treatment conditions) are the same as in Experimental Example 1. The prepared starch-blended preparations were each subjected to the RVA measurement in the same manner as in Experimental Example 1 to evaluate the inhibitory effect of each preparation on swelling and/or disintegration of starch granules. FIG. 7 shows the results.

TABLE 5

| | Starch | | Polysaccharide | | Treatment | | | Evaluation of |
|---|---|---|---|---|---|---|---|---|
| | Type | Ratio (%) | Type | Ratio (%) | Temperature (° C.) | time (minutes) | Treatment apparatus | swelling/disintegration inhibition |
| Ex. 2 (thick solid line) | Potato starch | 95 | Water-soluble hemicellulose | 5 | 120 | 10 | Autoclave | +++ |
| Comp. Ex. 9 (thick dashed line) | Potato starch | 95 | Raw soybean powder | 5 | 120 | 10 | Autoclave | + |
| Comp. Ex. 10 (dotted line) | Potato starch | 95 | Microcrystalline cellulose | 5 | 120 | 10 | Autoclave | + |
| Comp. Ex. 11 (single-dashed line) | Potato starch | 95 | Xanthan gum | 5 | 120 | 10 | Autoclave | ++ |

As shown in FIG. 7, the viscosities of a starch-blended preparation prepared by mixing potato starch with water-soluble hemicellulose (Example 2 (thick solid line: 1)) and a starch-blended preparation prepared by mixing potato starch with xanthan gum (Comparative Example 11 (single-dashed line: 4)) were suppressed, whereas a starch-blended preparation using water-soluble hemicellulose (Example 2) showed a lower initial viscosity and late upstroke of the viscosity curve, indicating a stronger inhibitory effect on swelling and disintegration of starch granules. A starch-blended preparation containing xanthan gum (Comparative Example 11 (single-dashed line: 4)) showed a high initial viscosity, and was poorly soluble. In contrast, in a starch-blended preparation containing raw soybean flour (Comparative Example 9 (thick dashed line: 2)) and a starch-blended preparation containing microcrystalline cellulose (Comparative Example 10 (dotted line: 3)), swelling and/or disintegration of starch were insufficiently suppressed because the increase in viscosity was not as suppressed as that of the starch-blended preparation of Example 2.

Experimental Example 5

Figure 8:
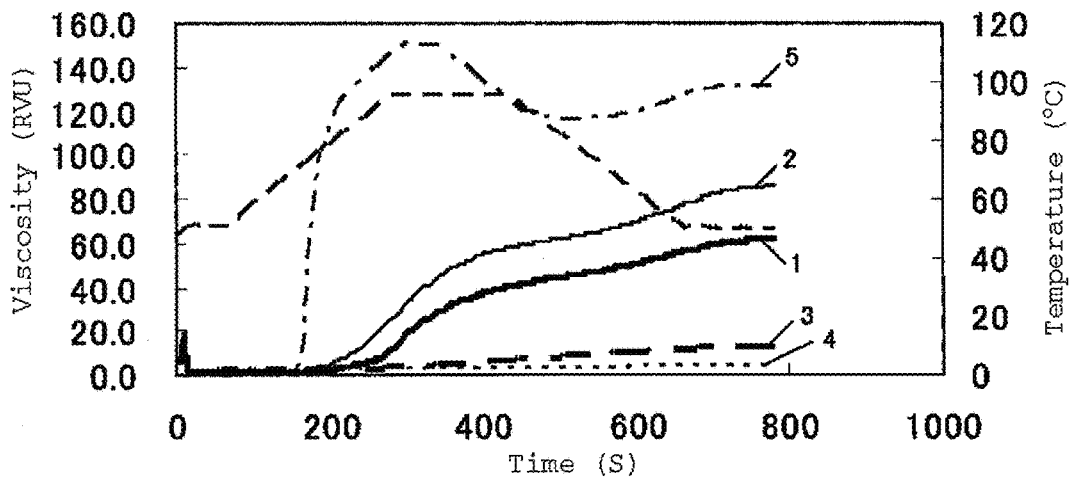
FIG. 8 shows the viscosity curves of the starch-blended preparations prepared in Example 1 (thick solid line: 1), Comparative Example 12 (thin solid line: 2), Example 8 (thick dashed line: 3), Example 9 (dotted line: 4), and Comparative Example 2 (single-dashed line: 5) measured by RVA.

Relationship Between Moist-Heat Treatment Time and Inhibitory Effect on Swelling and/or Disintegration In order to examine the relationship between the moist-heat treatment time and the inhibitory effect on swelling and/or disintegration of starch granules, starch-blended preparations were prepared according to the formulations shown in Table 6. The autoclave conditions (moist-heat treatment conditions) are the same as in Experimental Example 1. The prepared starch-blended preparations were each subjected to the RVA measurement in the same manner as in Experimental Example 1 to evaluate the inhibitory effect of each preparation on swelling and disintegration of starch granules. FIG. 8 shows the results.

inhibitory effect on swelling and disintegration, it seems unnecessary to extend the treatment time of the potato starch for a longer period of time.

Experimental Example 6

Relationship Between Treatment Temperature, Humidity, and Inhibitory Effect on Swelling and/or Disintegration In order to examine the relationship between the temperature and humidity during moist-heat treatment and the inhibitory effect on swelling and/or disintegration of starch granules, starch-blended preparations were prepared according to the formulations shown in Table 7. The autoclave conditions are the same as in Experimental Example 1.

The incubator used in the production of preparations of the Comparative Examples is a thermal treatment apparatus that can control the humidity and temperature at a constant level in such a manner that the inside of a normal pressure open-system treatment bath is heated by a heater while water is heated by another heater, after which the obtained steam is blown into the bath to generate an atmosphere in which the relative humidity is 100% in the bath; and in this state, the steam is discharged from the bath by an exhaust fan, as appropriate.

The prepared starch-blended preparations were each subjected to the RVA measurement in the same manner as in

TABLE 6

| | Starch | | Ratio of water-soluble hemicellulose (%) | Temperature (° C.) | Treatment time (minutes) | Treatment apparatus | Evaluation of swelling/disintegration inhibition |
|---|---|---|---|---|---|---|---|
| | Type | Ratio (%) | | | | | |
| Ex. 1 (thick solid line) | Potato starch | 99 | 1 | 120 | 10 | Autoclave | +++ |
| Ex. 8 (thick dashed line) | Potato starch | 99 | 1 | 120 | 60 | Autoclave | −+ |
| Ex. 9 (dotted line) | Potato starch | 99 | 1 | 120 | 120 | Autoclave | ++ |
| Comp. Ex. 2 (single-dashed line) | Potato starch | 99 | 1 | Untreated (treatment time: 0) | | | ± |
| Comp. Ex. 12 (thin solid line) | Potato starch | 99 | 1 | 120 | 2 | Autoclave | + |

* SM-1200 was used as water-soluble hemicellulose.

Figure 9:
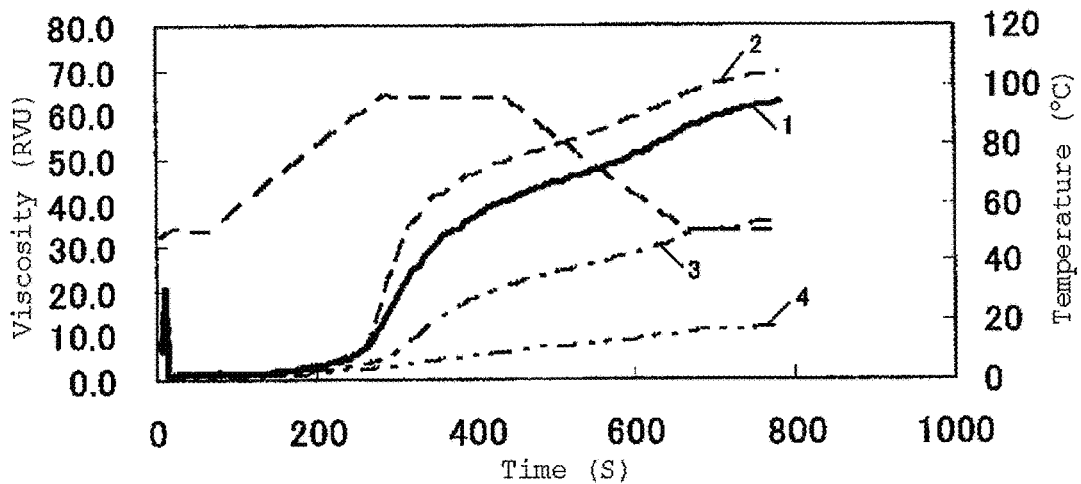
FIG. 9 shows the viscosity curves of the starch-blended preparations prepared in Example 1 (thick solid line: 1), Example 9 (dashed line: 2), Example 10 (single-dashed line: 3), and Example 11 (double-dashed line: 4) measured by RVA.
Figure 10:
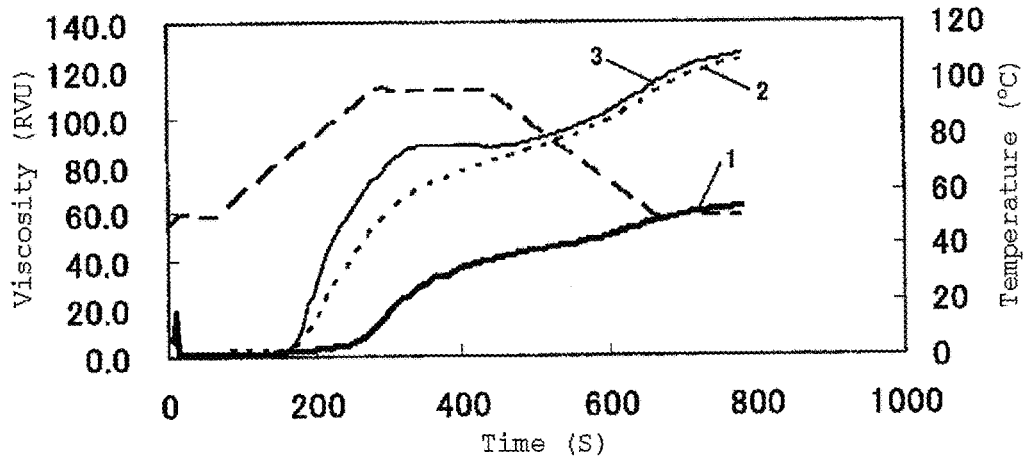
FIG. 10 shows the viscosity curves of the starch-blended preparations prepared in Example 1 (thick solid line: 1), Comparative Example 13 (dotted line: 2), and Comparative Example 14 (thin solid line: 3) measured by RVA.

FIG. 8 and the above results revealed that the inhibitory effect of each starch-blended preparation on swelling and/or disintegration of starch granules increased with an increase in the moist-heat treatment time. As the starch-blended preparation of Example 9 (dotted line: 4) subjected to moist-heat treatment for 120 minutes showed a sufficient Experimental Example 1 to evaluate the inhibitory effect of each preparation on swelling and disintegration of starch granules. The results are shown in FIG. 9 (Examples 1 and 9 to 11) and FIG. 10 (Comparative Examples 13 and 14). FIG. 10 also illustrates the graph of Example 1 (thick solid line) for comparison.

TABLE 7

|  |  | Starch | | Ratio of water-soluble hemicellulose (%) | Temperature (° C.) | Relative humidity (%) | Treatment time (minutes) | Treatment apparatus | Evaluation of swelling/disintegration inhibition |
|---|---|---|---|---|---|---|---|---|---|
|  |  | Type | Ratio (%) | | | | | | |
| FIG. 9 | Ex. 1 (thick solid line) | Potato starch | 99 | 1 | 120 | 100 | 10 | Autoclave | +++ |
|  | Ex. 9 (dashed line) | Potato starch | 99 | 1 | 110 | 100 | 10 | Autoclave | ++ |
|  | Ex. 10 (single-dashed line) | Potato starch | 99 | 1 | 130 | 100 | 5 | Autoclave | +++ |
|  | Ex. 11 (double-dashed line) | Potato starch | 99 | 1 | 130 | 100 | 10 | Autoclave | +++ |
| FIG. 10 | Comp. Ex. 13 (dotted line) | Potato starch | 99 | 1 | 85 | 95 | 60 | Constant temperature and humidity bath | + |
|  | Comp. Ex. 14 (thin solid line) | Potato starch | 99 | 1 | 150 | — | 30 | Constant temperature and humidity bath | + |

"—": dry heat treatment without humidity control
* SM-1200 was used as water-soluble hemicellulose.

As shown in FIG. 9, in moist-heat treatment using an autoclave in a saturated vapor atmosphere (relative humidity: 100%) at a treatment temperature of 110 to 130° C., better inhibitory effects on swelling and disintegration of starch granules were obtained at a higher temperature and for a longer treatment time.

On the other hand, as shown in FIG. 10, a starch-blended preparation treated at a relative humidity of 95% and a temperature of 85° C. (Comparative Example 13 (Symbol 2)) did not exhibit a sufficient inhibitory effect on swelling and/or disintegration, even with a longer treatment time. Moreover, the starch-blended preparation of Comparative Example 14 (Symbol 3) heated at 150° C. without steam (dry heat treatment) also did not exhibit a sufficient inhibitory effect on swelling and/or disintegration.

Experimental Example 7
Relationship Between Moist-Heat-Treatment Apparatus and Inhibitory Effect on Swelling and/or Disintegration Using a hybrid kiln (open system) as an apparatus for moist-heat treatment, various starch-blended preparations were prepared according to the formulations shown in Table 8. The prepared starch-blended preparations were each subjected to the RVA measurement in the same manner as in Experimental Example 1 to evaluate the inhibitory effect of each preparation on swelling and/or disintegration of starch granules.

A hybrid kiln is a rotary-type heating apparatus using an external heating system by induction heating (IH) in combination with an internal heating system by superheated steam, and can perform heating and humidifying treatment (moist-heat treatment) by supplying a sample to a kiln, followed by heating and injection of saturated steam. The steam amount (g/L) described in Table 8 is determined by dividing the steam weight (g) consumed during moist-heat treatment by the volume (L) of the treatment bath.

TABLE 8

|  | Starch | | Ratio of water-soluble hemicellulose* (%) | Temperature (° C.) | Steam amount (g/L) | Treatment time (minutes) | Treatment apparatus | Evaluation of swelling/disintegration inhibition |
|---|---|---|---|---|---|---|---|---|
|  | Type | Ratio (%) | | | | | | |
| Ex. 12 (dotted line: 1) | Potato starch | 99 | 1 | 120 | 913 | 60 | Hybrid kiln | ++ |
| Ex. 13 (thick dashed line: 2) | Potato starch | 99 | 1 | 150 | 228 | 15 | Hybrid kiln | ++ |

TABLE 8-continued

| | Starch | | Ratio of water-soluble hemicellulose* | Temperature | Steam amount | Treatment time | Treatment | Evaluation of swelling/disintegration |
|---|---|---|---|---|---|---|---|---|
| | Type | Ratio (%) | (%) | (° C.) | (g/L) | (minutes) | apparatus | inhibition |
| Ex. 14 (thin solid line: 3) | Potato starch | 99 | 1 | 200 | 76 | 5 | Hybrid kiln | ++ |
| Ex. 15 (thick solid line: 4) | Potato starch | 95 | 5 | 105 | 228 | 15 | Hybrid kiln | +++ |
| Comp. Ex. 1 (double-dashed line) | Potato starch | 100 | 0 | | Untreated | | | ± |
| Comp. Ex. 2 (dashed line) | Potato starch | 99 | 1 | | Untreated | | | + |
| Comp. Ex. 15 (single dashed solid line) | Potato starch | 95 | 5 | | Untreated | | | + |

*SM-1200 was used as water-soluble hemicellulose.

Figure 11:
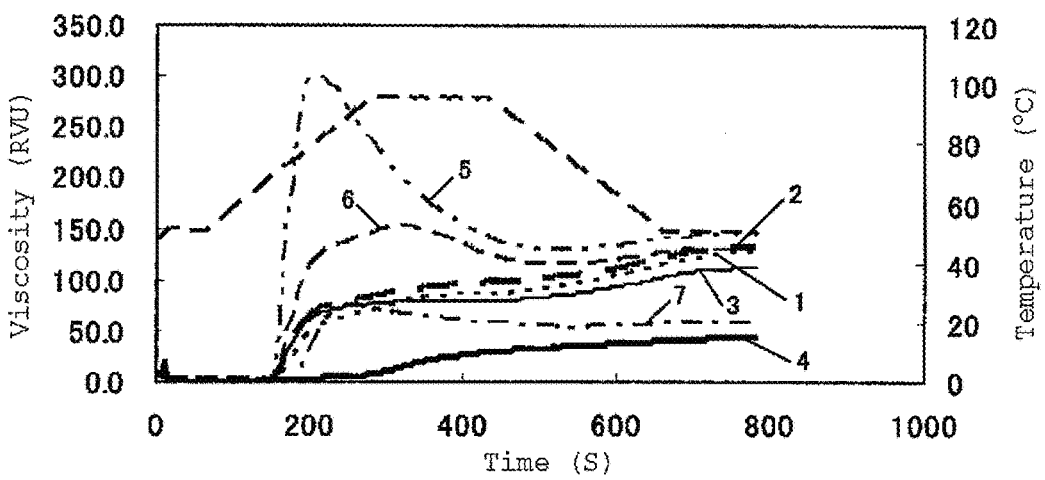
FIG. 11 shows the viscosity curves of the starch-blended preparations prepared in Example 12 (dotted line: 1), Example 13 (thick dashed line: 2), Example 14 (thin solid line: 3), Example 15 (thick solid line: 4), Comparative Example 1 (double-dashed line: 5), Comparative Example 2 (dashed line: 6), and Comparative Example 15 (single-dashed line: 7) measured by RVA.

FIG. 11 shows the results.

As is clear from FIG. 11, in a moist-heat treatment using a hybrid kiln, which is equivalent to an open-system vessel, the treatment at a temperature of 105 to 200° C. with a steam amount of 76 to 913 g/L could sufficiently suppress the generation of breakdown, confirming that swelling and disintegration of starch granules were suppressed.

(II) Evaluation 2

Retort Resistance of Starch-Blended Preparation (Solution State)

Experimental Example 8

The retort resistance was measured using the starch-blended preparations prepared in Example 3 (potato starch: water-soluble hemicellulose=90:10, autoclave moist-heat-treatment at 120° C. for 10 minutes), Example 14 (potato starch:water-soluble hemicellulose=99:1, hybrid kiln moist-heat-treatment at 200° C. for 5 minutes) and Comparative Example 4 (potato starch, autoclave moist-heat-treatment at 120° C. for 10 minutes). More specifically, salt and water were incorporated into each starch-blended preparation at the ratios shown in Table 9, and the mixture was stirred under heating for 10 minutes in a boiling-water bath after the temperature reached 80° C., thereby preparing pasty liquids. The pasty liquids were each placed in an aluminum laminate pouch, followed by retort sterilization at 121° C. for 20 minutes. On the following day, the solution state of each pasty liquid was observed before and after retort treatment while the viscosity was measured using a B-type viscometer (type BL; produced by Tokyo Keiki Inc.) at 20° C. at 30 rpm for 60 seconds. A No. 4 rotor was used, although a No. 3 rotor was used to measure viscosities of less than 2,000 mPa·s.

TABLE 9

| Starting material | Weight % |
|---|---|
| Starch preparation | 5 (as starch) |
| Salt | 1 |
| Water | Added to a total amount of 100 Weight % |

Table 10 shows the results.

TABLE 10

| | Ex. 3 | | Ex. 14 | | Comp. Ex. 4 | |
|---|---|---|---|---|---|---|
| | Viscosity (mPa · s) | Solution state | Viscosity (mPa · s) | Solution state | Viscosity (mPa · s) | Solution state |
| Before retort | 2,960 | Pasty | 7,040 | Pasty | 1,369 | Pasty |
| After retort | 5,720 | Pasty | 5,360 | Pasty | 10,940 | Gelled (aged) |

As shown in Table 10, in a pasty liquid prepared from the starch-blended preparation of Comparative Example 4, the viscosity remarkably increased and the gelation proceeded as a result of retort treatment. In the pasty liquids prepared from the starch-blended preparations of Examples 3 and 14, no changes occurred in the solution state after retort treatment (gelation was suppressed), and the increase in viscosity was significantly suppressed compared with the preparation of Comparative Example 4.

(III) Evaluation 3

Retort Resistance of Starch-Blended Preparation (Color and Flavor)

Experimental Example 9

The retort resistance was measured using the starch-blended preparations prepared in Example 10 (potato starch: water-soluble hemicellulose=99:1, autoclave moist-heattreatment at 130° C. for 5 minutes), Example 11 (potato starch:water-soluble hemicellulose=99:1, autoclave moist-heat-treatment at 130° C. for 10 minutes) and Comparative Example 5 (potato starch:water-soluble hemicellulose=70:30, autoclave moist-heat-treatment at 120° C. for 10 minutes). More specifically, salt and water were mixed into each starch-blended preparation at the ratios shown in Table 9, and the mixture was stirred under heating for 10 minutes in a boiling-water bath after the temperature reached 80° C., thereby preparing pasty liquids. The pasty liquids were each placed in an aluminum laminate pouch, followed by retort sterilization at 121° C. for 20 minutes. On the following day, the presence of coloring and smell in each pasty liquid was examined before and after retort treatment.

As shown in Table 11, the results indicated that coloring tended to become remarkable and the soybean smell also tended to become strong as the proportion of water-soluble hemicellulose was increased. Particularly, the starch-blended preparation of Comparative Example 5, in which the proportion of starch to water-soluble hemicellulose was 70:30, had remarkable coloration and a remarkable smell.

TABLE 11

|  | Ex. 10 | Ex. 11 | Comp. Ex. 5 |
|---|---|---|---|
| Starch:water-soluble hemicellulose | 90:10 | 80:20 | 70:30 |
| Coloring | Inconsiderable coloration | Slight coloration | Remarkable coloration |
| Smell | Inconsiderable soybean smell | Slight soybean smell | Remarkable soybean smell |

(IV) Evaluation 4

Influence of Addition of Alkaline Compound
Experimental Example 10

Using waxy corn starch as starch, the influence of an alkaline compound (sodium carbonate) on the inhibitory effect on swelling and/or disintegration of starch granules was examined.

(1) When waxy corn starch is mixed with water-soluble hemicellulose (SM-1200), and sodium carbonate is further mixed at different ratios, followed by moist-heat treatment Various starch-blended preparations were prepared according to the formulations shown in Table 12, and RVA measurement was performed in the same manner as in Experimental Example 1 to evaluate the inhibitory effect of each preparation on swelling and/or disintegration of starch granules. In Tables 12 and 14, the swelling and disintegration inhibitory effect of each preparation was evaluated using the results of Comparative Example 8 as the evaluation standard.

Each symbol represents the inhibitory effects described below.

±: Control

For the suppression of swelling and disintegration of starch granules:

+++: remarkably effective

++: effective

Δ+: slightly effective

−: ineffective

Moreover, the pH of water, in which each sample was dispersed, was measured at room temperature before RVA measurement using a pH meter (F-21; produced by Horiba, Ltd.).

TABLE 12

| | Ratio (%) | | | | | | | | |
|---|---|---|---|---|---|---|---|---|---|
| | Waxy corn starch | Water-soluble hemicellulose | Na carbonate (%; with respect to starch) | Temperature (° C.) | Relative humidity (%) | Treatment time (minutes) | Treatment apparatus | Evaluation of swelling/disintegration inhibition | pH |
| Ex. 16 (thick solid line) | 95 | 5 | Not mixed | 130 | 100 | 180 | Autoclave | ++ | 4.85 |
| Ex. 17 (thin solid line) | 95 | 5 | 0.005 | 130 | 100 | 180 | Autoclave | ++ | 4.92 |
| Ex. 18 (dotted line) | 95 | 5 | 0.01 | 130 | 100 | 180 | Autoclave | +++ | 4.98 |
| Ex. 19 (thick dashed line) | 95 | 5 | 0.2 | 130 | 100 | 180 | Autoclave | +++ | 6.16 |
| Ex. 20 (single-dashed line) | 95 | 5 | 0.5 | 130 | 100 | 180 | Autoclave | +++ | 7.38 |
| Ex. 21 (double-dashed line) | 95 | 5 | 1 | 130 | 100 | 180 | Autoclave | ++ | 8.42 |

Figure 12:
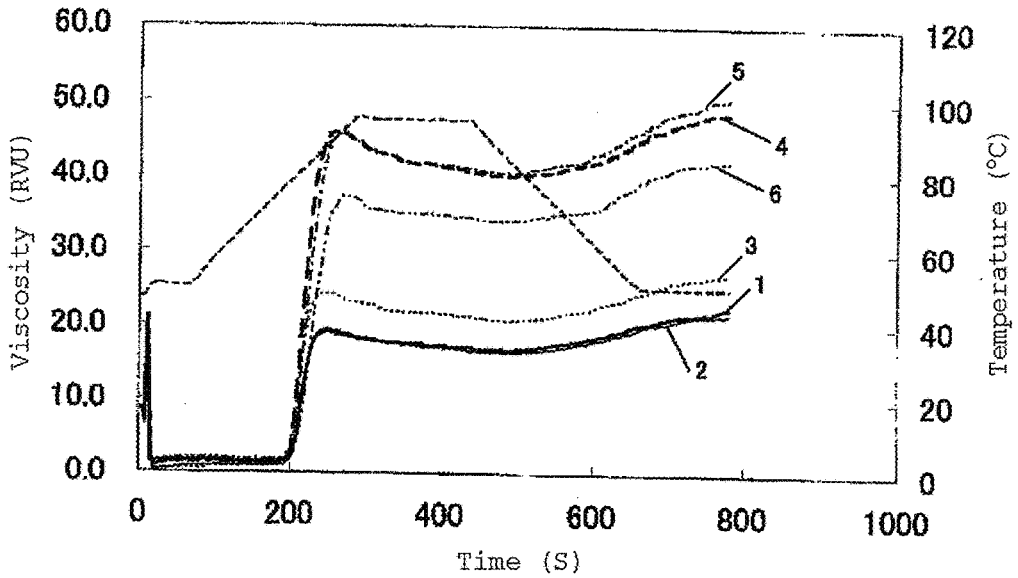
FIG. 12 shows the viscosity curves of the starch-blended preparations prepared in Example 16 (thick solid line: 1), Example 17 (thin solid line: 2), Example 18 (dotted line: 3), Example 19 (thick solid line: 4), Example 20 (single-dashed line: 5), and Example 21 (double-dashed line: 6) measured by RVA.

FIG. 12 shows the viscosity curves of starch-blended preparations (Examples 16 to 21) each obtained by mixing waxy corn starch with water-soluble hemicellulose at a ratio of 95:5, and further mixing sodium carbonate at the ratios shown in Table 12, followed by moist-heat treatment (relative humidity: 100%) using an autoclave at 130° C. for 180 minutes under the saturated vapor pressure.

When the ratio of sodium carbonate was 0.005% (Example 17), the curve was not particularly different from that of the sodium carbonate-free preparation (Example 16). When the ratio of sodium carbonate was 0.01% or higher, the viscosity increased as the ratio of sodium carbonate was increased up to 0.5% (Examples 18 to 20). However, when the ratio of sodium carbonate was 1% (Example 21), the viscosity was lower than in the preparation containing sodium carbonate at a ratio of 0.5% (Example 20). As a result of observing the state of starch granules of each paste after the RVA measurement, the disintegration of starch granules was observed in the preparation containing sodium carbonate at a ratio of 1%, while no disintegration was observed in the other samples. This indicated that an overly high ratio of sodium carbonate resulted in a reduced effect.

TABLE 13

|  | Viscosity before retort (mPa · s) | Viscosity after retort (mPa · s) | State of starch after retort |
|---|---|---|---|
| Ex. 16 | 1,332 | 133 | Completely decomposed |
| Ex. 19 | 3,860 | 2,640 | Disintegrated but fragments remained |

In order to further examine the effect due to the presence of sodium carbonate, the retort resistance was evaluated using the sodium carbonate-free preparation (Example 16) and the preparation containing sodium carbonate at a ratio of 0.2% (Example 19). Table 13 shows the results. These preparations were produced and evaluated in the same manner as in Experimental Example 9.

The comparison of the samples with respect to the viscosity before and after retort treatment, and the state of starch granules after treatment demonstrated that the addition of sodium carbonate resulted in a smaller decrease of viscosity after retort treatment, and that the disintegration of starch granules was suppressed.

(2) The following effects were examined: the effect of the treatment time when waxy corn starch was mixed with water-soluble hemicellulose and sodium carbonate, followed by moist-heat treatment; the effect when waxy corn starch was mixed with sodium carbonate, and no moist-heat treatment followed; and the effect when waxy corn starch was mixed with water-soluble hemicellulose and sodium carbonate, and no moist-heat treatment followed.

Various starch-blended preparations were prepared according to the formulations shown in Table 14, and RVA measurement was performed in the same manner as in Experimental Example 1 to evaluate the inhibitory effect of each preparation on swelling and/or disintegration of starch granules.

TABLE 14

|  | Ratio of waxy corn starch (%) | Ratio of water-soluble hemicellulose (%) | Ratio of Na carbonate (%; with respect to starch) | Temperature (° C.) | Treatment time (minutes) | Treatment apparatus | Evaluation of swelling/disintegration inhibition |
|---|---|---|---|---|---|---|---|
| Ex. 22 (FIG. 13: thin solid line) | 95 | 5 | 0.2 | 130 | 60 | Autoclave | ++ |
| Ex. 19 (FIG. 13: thick solid line) | 95 | 5 | 0.2 | 130 | 180 | Autoclave | +++ |
| Ex. 23 (FIG. 13: dotted line) | 95 | 5 | 0.2 | 130 | 300 | Autoclave | +++ |
| Comp. Ex. 8 (FIG. 14: thick solid line) (FIG. 15: thick solid line) | 100 | Not mixed | Not mixed |  |  | Untreated | ± |
| Comp. Ex. 15 (FIG. 14: thin solid line) | 100 | Not mixed | 0.1 |  |  | Untreated | − |
| Comp. Ex. 16 (FIG. 14: dotted line) (FIG. 15: thin solid line) | 100 | Not mixed | 0.2 |  |  | Untreated | − |
| Comp. Ex. 17 (FIG. 13: thick dashed line) (FIG. 15: dotted line) | 95 | 5 | 0.2 |  |  | Untreated | − |

* SM-1200 was used as water-soluble hemicellulose.

Figure 13:
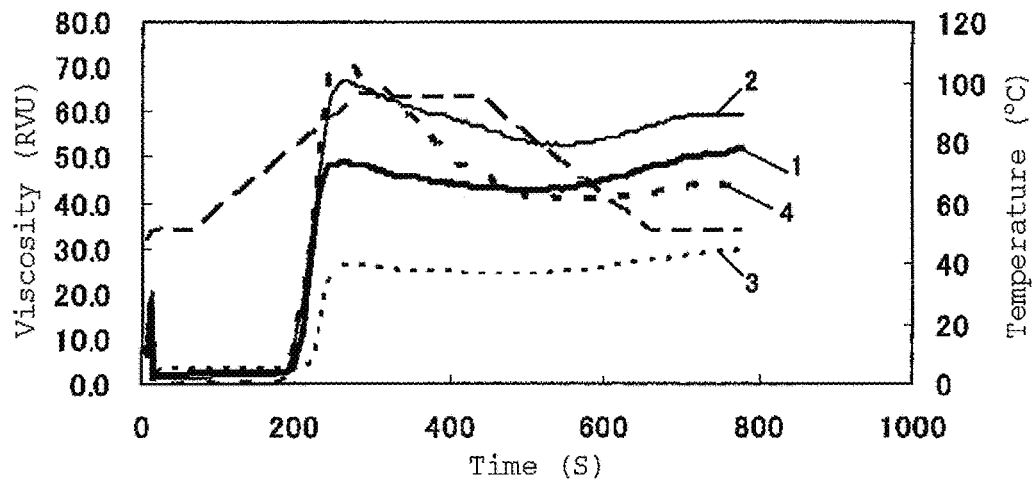
FIG. 13 shows the viscosity curves of the starch-blended preparations prepared in Example 19 (thick solid line: 1), Example 22 (thin solid line: 2), Example 23 (dotted line: 3), and Comparative Example 17 (thick dashed line: 4) measured by RVA.

FIG. 13 shows the viscosity curves of the starch-blended preparations (Examples 19, 22 and 23) each obtained by mixing waxy corn starch with water-soluble hemicellulose at a ratio of 95:5, and further mixing sodium carbonate at a ratio of 0.2%, followed by moist-heat treatment (relative humidity: 100%) using an autoclave at 130° C. for 60 to 300 minutes under the saturated vapor pressure, and an untreated preparation (Comparative Example 17). When waxy corn starch was mixed with water-soluble hemicellulose and sodium carbonate, followed by moist-heat treatment for different periods of time, the peak viscosity decreased and the breakdown also reduced with the increase in the treatment time (untreated (Comparative Example 17), 60 minutes (Example 22), 180 minutes (Example 19) and 300 minutes (Example 23)). This indicated that the suppression of swelling and disintegration of starch granules was promoted.

Figure 14:
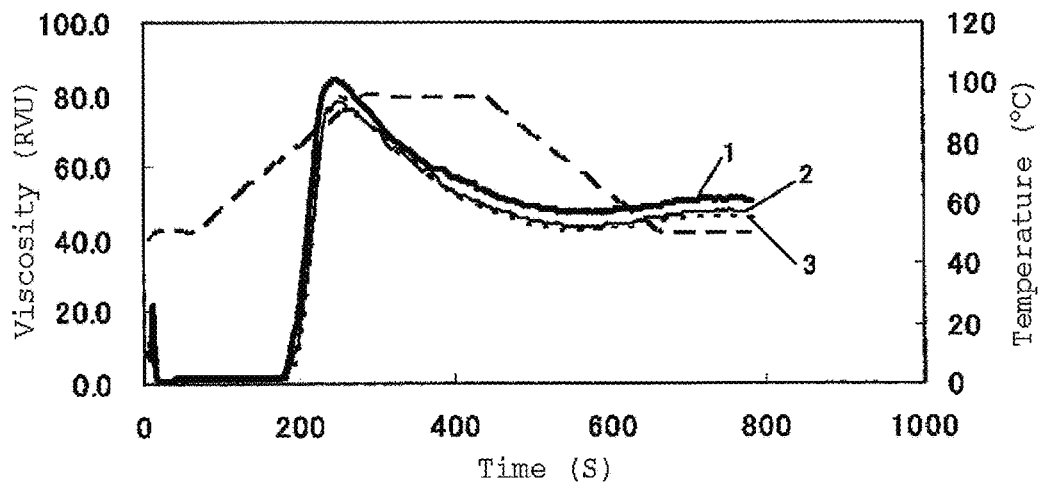
FIG. 14 shows the viscosity curves of the starch-blended preparations prepared in Comparative Example 8 (thick solid line: 1), Comparative Example 15 (thin solid line: 2), and Comparative Example 16 (dotted line: 3) measured by RVA.
Figure 15:
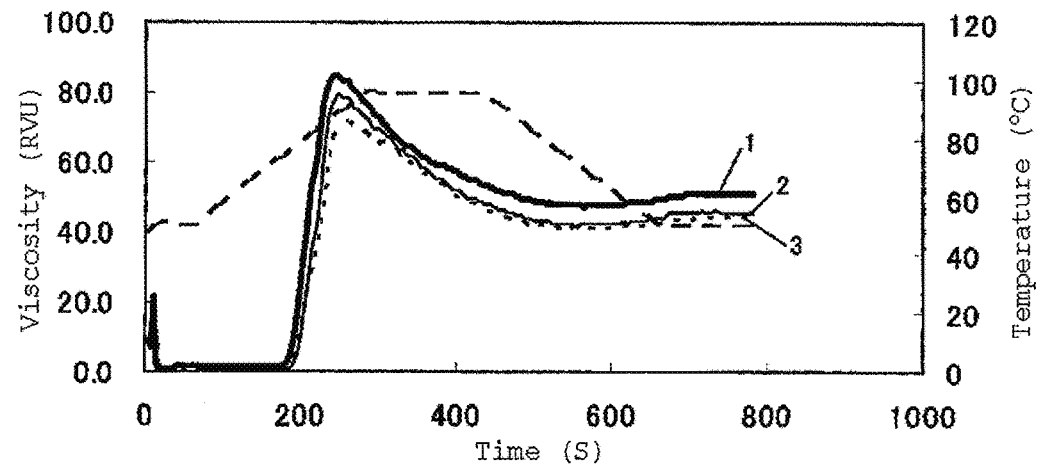
FIG. 15 shows the viscosity curves of the starch-blended preparations prepared in Comparative Example 8 (thick solid line: 1), Comparative Example 16 (thin solid line: 2), and Comparative Example 17 (dotted line: 3) measured by RVA.

FIG. 14 shows the viscosity curves of the starch-blended preparations (Comparative Examples 8, 15 and 16) in which the ratio of sodium carbonate to waxy corn starch was changed from 0 to 0.2%. Even when waxy corn starch was mixed with sodium carbonate, the viscosity curve was hardly different from that of the sodium carbonate-free preparation, showing no inhibitory effect on swelling and/or disintegration of starch granules. FIG. 15 shows the viscosity curves of the preparation obtained by mixing waxy corn starch with 0.2% of sodium carbonate (Comparative Example 16), the preparation obtained by mixing waxy corn starch with water-soluble hemicellulose at a ratio of 95:5, and further mixing sodium carbonate at a ratio of 0.2% (Comparative Example 17) and the untreated waxy corn starch (Comparative Example 8).

It was found that even when waxy corn starch was mixed with water-soluble hemicellulose and sodium carbonate, the viscosity curve was similar to those of water-soluble hemicellulose-free samples and untreated waxy corn starch; and the inhibitory effect on swelling and/or disintegration was not exhibited, unless moist-heat treatment was performed.

Experimental Example 11

Using starch other than waxy corn starch as starch, the influence of an alkali metal (sodium carbonate) on the inhibitory effect on swelling and/or disintegration of starch granules was examined. The swelling and disintegration inhibitory effects of the preparations of Comparative Examples 1, 7 and 17 were used as the standard in Tables 15, 16 and 17, respectively.

Each symbol represents the inhibitory effects described below.

±: Control

For the suppression of swelling and disintegration of starch granules:

+++: remarkably effective
++: effective
+: slightly effective
−: ineffective (1) When potato starch was mixed with water-soluble hemicellulose and sodium carbonate, followed by moist-heat treatment Various starch-blended preparations were prepared according to the formulations shown in Table 15, and RVA measurement was performed in the same manner as in Experimental Example 1 to evaluate the inhibitory effect of each preparation on swelling and/or disintegration of starch granules.

TABLE 15

| | Ratio (%) | | | | | | |
|---|---|---|---|---|---|---|---|
| | Potato starch | Water-soluble hemicellulose | Na carbonate (%; with respect to starch) | Temperature (° C.) | Relative humidity (%) | Treatment time (minutes) | Treatment apparatus | Evaluation of swelling/disintegration inhibition |
| Comp. Ex. 1 (dotted line) | 100 | Not mixed | Not mixed | Untreated | — | — | — | ± |
| Ex. 24 (thick solid line) | 99 | 1 | Not mixed | 110 | 100 | 60 | Autoclave | +++ |
| Ex. 25 (thin solid line) | 99 | 1 | 0.1 | 110 | 100 | 60 | Autoclave | +++ |

* SM-1200 was used as water-soluble hemicellulose.

Figure 16:
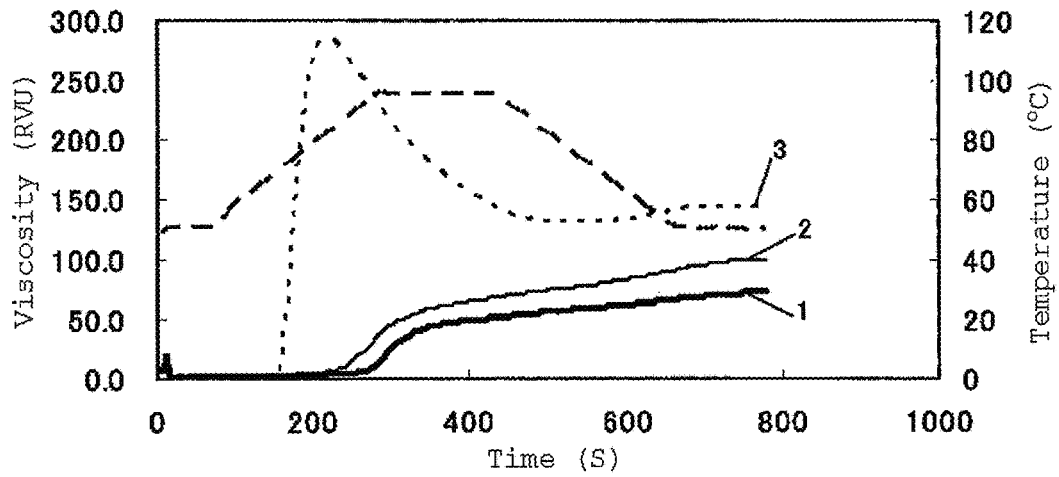
FIG. 16 shows the viscosity curves of the starch-blended preparations prepared in Example 24 (thick solid line: 1), Example 25 (thin solid line: 2), and Comparative Example 1 (dotted line: 3) measured by RVA.

FIG. 16 shows the viscosity curves of the starch-blended preparations (Examples 24 and 25) each obtained by mixing potato starch with water-soluble hemicellulose at a ratio of 99:1, and further mixing sodium carbonate at a ratio of 0.1% or not mixing sodium carbonate, followed by moist-heat treatment (relative humidity: 100%) using an autoclave at 110° C. for 60 minutes under the saturated vapor pressure, and the untreated potato starch (Comparative Example 1). When potato starch was mixed with water-soluble hemicellulose (Example 24), compared with the untreated potato starch (Comparative Example 1), the peak viscosity did not appear and the breakdown did not occur, and the inhibitory effect on swelling and disintegration of starch granules was acknowledged. However, even when this mixture was further mixed with sodium carbonate (Example 25), a very similar viscosity curve was obtained, and thus, there was no advantage in mixing sodium carbonate.

(2) When tapioca starch was mixed with water-soluble hemicellulose and sodium carbonate, followed by moist-heat treatment Various starch-blended preparations were prepared according to the formulations shown in Table 16, and RVA measurement was performed in the same manner as in Experimental Example 1 to evaluate the inhibitory effect of each preparation on swelling and/or disintegration of starch granules.

TABLE 16

| | Ratio (%) | | Na carbonate (%; with respect to starch) | Temperature (° C.) | Relative humidity (%) | Treatment time (minutes) | Treatment apparatus | Evaluation of swelling/disintegration inhibition |
|---|---|---|---|---|---|---|---|---|
| | Tapioca starch | Water-soluble hemicellulose | | | | | | |
| Comp. Ex. 7 (dotted line) | 100 | Not mixed | Not mixed | Untreated | — | — | — | ± |
| Ex. 26 (thick solid line) | 95 | 5 | Not mixed | 130 | 100 | 60 | Autoclave | ++ |
| Ex. 27 (thin solid line) | 95 | 5 | 0.1 | 130 | 100 | 60 | Autoclave | +++ |

* SM-1200 was used as water-soluble hemicellulose.

Figure 17:
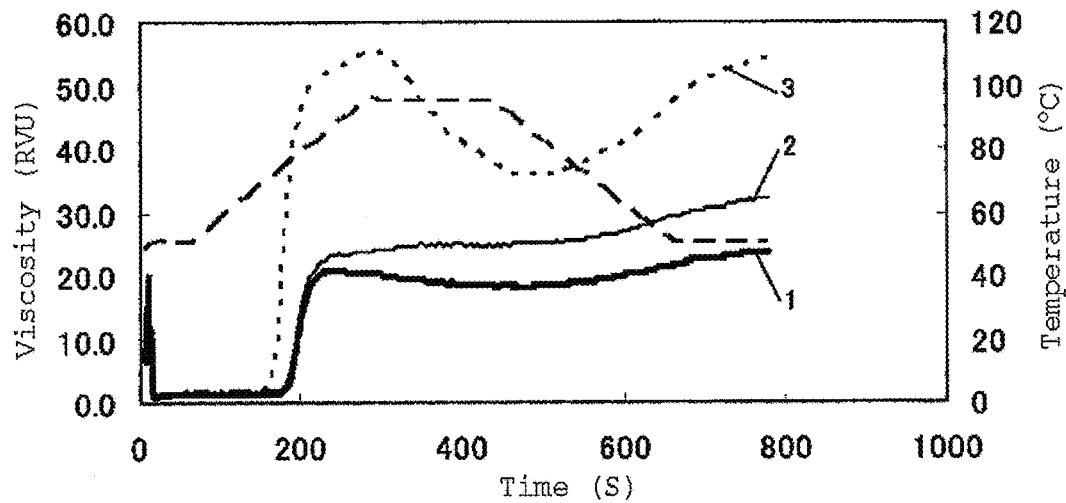
FIG. 17 shows the viscosity curves of the starch-blended preparations prepared in Example 26 (thick solid line: 1), Example 27 (thin solid line: 2), and Comparative Example 7 (dotted line: 3) measured by RVA.

FIG. 17 shows the viscosity curves of the starch-blended preparations (Examples 26 and 27) each obtained by mixing tapioca starch with water-soluble hemicellulose at a ratio of 95:5; and further mixing sodium carbonate at a ratio of 0.1% or not mixing sodium carbonate, followed by moist-heat treatment (relative humidity: 100%) using an autoclave at 130° C. for 60 minutes under the saturated vapor pressure, and the untreated tapioca starch (Comparative Example 7).

When tapioca starch was mixed with water-soluble hemicellulose (Example 26), compared with the untreated tapioca starch (Comparative Example 7), the peak viscosity decreased and the breakdown reduced, and the inhibitory effect on swelling and disintegration of starch granules was acknowledged. However, when this mixture was further mixed with sodium carbonate (Example 27), the breakdown did not occur, indicating that the addition of sodium carbonate promoted the suppression of swelling and disintegration of starch granules.

(3) When glutinous rice starch was mixed with water-soluble hemicellulose and sodium carbonate, followed by moist-heat treatment Various starch-blended preparations were prepared according to the formulations shown in Table 17, and RVA measurement was performed in the same manner as in Experimental Example 1 to evaluate the inhibitory effect of each preparation on swelling and/or disintegration of starch granules.

Figure 18:
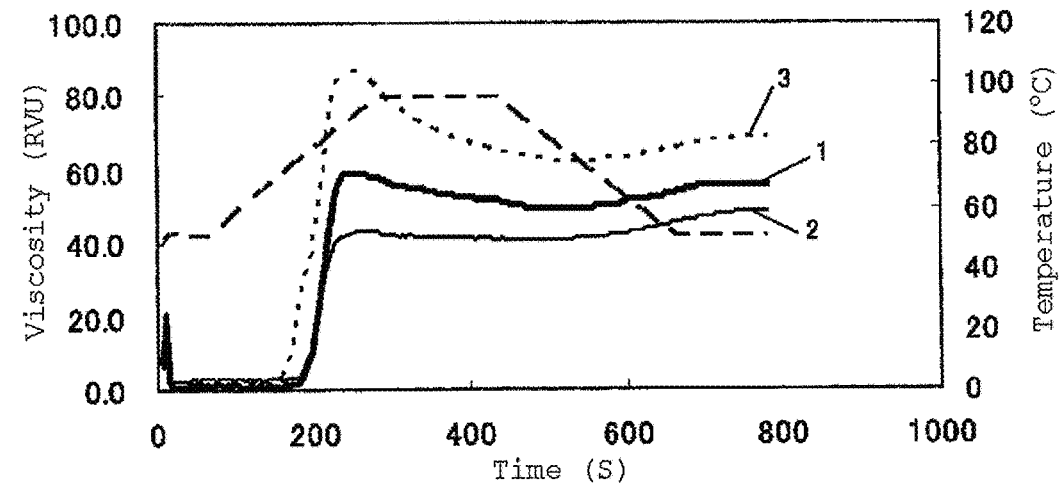
FIG. 18 shows the viscosity curves of the starch-blended preparations prepared in Example 28 (thick solid line: 1), Example 29 (thin solid line: 2), and Comparative Example 17 (dotted line: 3) measured by RVA.

FIG. 18 shows the viscosity curves of the starch-blended preparations (Examples 28 and 29) each obtained by mixing glutinous rice starch with water-soluble hemicellulose at a ratio of 95:5; and further mixing sodium carbonate at a ratio of 0.1% or not mixing sodium carbonate, followed by moist-heat treatment (relative humidity: 100%) using an autoclave at 130° C. for 60 minutes under saturated vapor pressure, and untreated glutinous rice starch (Comparative Example 17).

When tapioca starch was mixed with water-soluble hemicellulose (Example 28), compared with the untreated tapioca starch (Comparative Example 17), the peak viscosity decreased and the breakdown reduced, and the inhibitory effect on swelling and disintegration of starch granules was acknowledged. However, when this mixture was further mixed with sodium carbonate (Example 29), the peak viscosity further decreased and the breakdown reduced as well, indicating that the addition of sodium carbonate promoted the suppression of swelling and disintegration of starch granules.

(V) Application to Food Product

The following provides examples of food products to which various starch-blended preparations were applied. In

TABLE 17

| | Ratio (%) | | Na carbonate (%; with respect to starch) | Temperature (° C.) | Treatment time (minutes) | Relative humidity (%) | Treatment apparatus | Evaluation of swelling/disintegration inhibition |
|---|---|---|---|---|---|---|---|---|
| | Glutinous rice starch | Water-soluble hemicellulose | | | | | | |
| Comp. Ex. 17 (dotted line) | 100 | Not mixed | Not mixed | Untreated | — | — | — | ± |
| Ex. 28 (thick solid line) | 95 | 5 | Not mixed | 130 | 60 | 100 | Autoclave | ++ |
| Ex. 29 (thin solid line) | 95 | 5 | 0.1 | 130 | 60 | 100 | Autoclave | +++ |

* SM-1200 was used as water-soluble hemicellulose.

each formulation, "*" indicates a registered trademark of San-Ei Gen F.F.I., Inc.; similarly, "**" indicates a product of San-Ei Gen F.F.I., Inc. As reference examples, the commercially available starch-blended preparations shown in Table 18 were used.

TABLE 18

|  | Product Name | Classification | Manufacturer |
|---|---|---|---|
| Ref. Ex. 1 | Farinex VA 70 C | Processed starch | Matsutani Chemical Industry Co., Ltd. |
| Ref. Ex. 2 | Novation Prima 600 | Physically modified starch | Nippon NSC Ltd. |
| Ref. Ex. 3 | Purity 420 | Processed starch | Nippon NSC Ltd. |
| Ref. Ex. 4 | Colflo 67 | Processed starch | Nippon NSC Ltd. |

Formulation Example 1

(1) Preparation of Custard Cream

Using the starch products of Example 11, Comparative Example 1, Reference Example 1 and Reference Example 2, custard creams were prepared according to the formulations shown in Table 19 (Samples 1 to 4).

TABLE 19

|  | Sample 1 | Sample 2 | Sample 3 | Sample 4 |
|---|---|---|---|---|
| Starch-blended preparation (Ex. 8) | 3.03 parts | — | — | — |
| Potato starch (Comp. Ex. 1) | — | 3 parts | — | — |
| Processed starch (Ref. Ex. 1) | — | — | 3 parts | — |
| Physically modified starch (Ref. Ex. 2) | — | — | — | 3 parts |
| Sugar | 25 parts | 25 parts | 25 parts | 25 parts |
| Unsalted butter | 7 parts | 7 parts | 7 parts | 7 parts |
| 20% sweetened whole egg | 2 parts | 2 parts | 2 parts | 2 parts |
| 20% sweetened egg yolk | 1.5 parts | 1.5 parts | 1.5 parts | 1.5 parts |
| Glycine | 2 parts | 2 parts | 2 parts | 2 parts |
| Soft flour | 1 part | 1 part | 1 part | 1 part |
| Milk protein concentrate (MILPRO* WG900**) | 1 part | 1 part | 1 part | 1 part |
| Polysaccharide thickener (GEL UP* PI-1000**) | 0.3 parts | 0.3 parts | 0.3 parts | 0.3 parts |
| Polysaccharide thickener (carrageenan CIS-1**) | 0.14 parts | 0.14 parts | 0.14 parts | 0.14 parts |
| Flavoring agent (vanilla flavoring No. 93-I**) | 0.1 parts | 0.1 parts | 0.1 parts | 0.1 parts |
| Total amount after adding water | 100 parts | 100 parts | 100 parts | 100 parts |

Preparation Method
(1) The ingredients other than the flavoring agent are stirred and dispersed in warm water at 40° C.
(2) The mixture is emulsified by a homomixer for 1 minute.
(3) The emulsified product is boiled while stirring, and then further stirred for 3 minutes.
(4) The flavoring agent is added to adjust the moisture content.
(5) The resultant is placed in a container, and cooled in cold water.

(2) Evaluation

The prepared custard creams were stored in a refrigerator (4° C.), and their texture was evaluated 24 hours later. Table 20 shows the results.

TABLE 20

|  | State of flour paste |
|---|---|
| Sample 1 (Ex. 8) | Good meltability in the mouth |
| Sample 2 (Comp. Ex. 1) | Gel-like |

TABLE 20-continued

|  | State of flour paste |
|---|---|
| Sample 3 (Ref. Ex. 1) | Good meltability in the mouth |
| Sample 4 (Ref. Ex. 2) | Slightly gel-like |

As shown in Table 20, the custard cream (Sample 1) prepared using the starch-blended preparation of Example 8 had good meltability in the mouth, similarly to the flower paste (Sample 3) prepared using the processed starch (Reference Example 1) widely used in custard creams. Samples 2 and 4 prepared using the unprocessed potato starch (Comparative Example 1) and the physically modified starch (Reference Example 2) had a gel-like texture resulting from starch granules swollen because of the shear caused by heating and stirring.

Formulation Example 2

(1) Preparation of Mayonnaise-Type Dressing

Using the starch products of Example 20, Comparative Example 1, Reference Example 2 and Reference Example 3, mayonnaise-type dressings were prepared according to the formulations shown in Table 21 (Samples 5 to 8).

TABLE 21

|  | Sample 5 | Sample 6 | Sample 7 | Sample 8 |
|---|---|---|---|---|
| Starch-blended preparation (Ex. 15) | 4.2 parts | — | — | — |
| Potato starch (Comp. Ex. 1) | — | 4 parts | — | — |
| Physically modified starch (Ref. Ex. 2) | — | — | 4 parts | — |
| Treated starch (Ref. Ex. 3) | — | — | — | 4 parts |
| Cooking oil | 35 parts | 35 parts | 35 parts | 35 parts |
| Brewed vinegar (acid degree: 10%) | 2 parts | 2 parts | 2 parts | 2 parts |
| Apple vinegar (acid degree: 5%) | 3 parts | 3 parts | 3 parts | 3 parts |
| Lemon juice (straight) | 2 parts | 2 parts | 2 parts | 2 parts |
| 20% sweetened egg yolk | 12.5 parts | 12.5 parts | 12.5 parts | 12.5 parts |
| Salt | 2.5 parts | 2.5 parts | 2.5 parts | 2.5 parts |
| Sugar | 0.5 parts | 0.5 parts | 0.5 parts | 0.5 parts |
| Monosodium L-glutamate | 0.5 parts | 0.5 parts | 0.5 parts | 0.5 parts |
| Seasoning agent (SAN LIKE* amino-based NAG**) | 0.3 parts | 0.3 parts | 0.3 parts | 0.3 parts |
| Flavoring agent (Italian lemon essence**) | 0.1 parts | 0.1 parts | 0.1 parts | 0.1 parts |
| Flavoring agent (Mayonnaise oil SV3283**) | 0.3 parts | 0.3 parts | 0.3 parts | 0.3 parts |
| Flavoring agent (MULTIHANCER* No. 1**) | 0.02 parts | 0.02 parts | 0.02 parts | 0.02 parts |
| Total amount after adding water | 100 parts | 100 parts | 100 parts | 100 parts |

Preparation Method
(1) Each of the starch product, sugar, sodium L-glutamate and seasoning are added to water while stirring, and heated at 90° C. for 10 minutes.
(2) After cooling to room temperature, the moisture content is adjusted, and 20% egg yolk is added and stirred.
(3) Fermented vinegar, apple vinegar and lemon juice are added and stirred.
(4) Salad oil is gradually added while stirring.
(5) The mayonnaise is emulsified using a colloid mill (clearance: 200μ).
(6) The resultant is placed in a container.

(2) Evaluation

The dressings prepared in the above manner were stored in a refrigerator (4° C.), and their state was evaluated 24 hours later.

TABLE 22

|  | State of dressing |
|---|---|
| Sample 5 (Ex. 15) | Smooth and excellent shape retainability |
| Sample 6 (Comp. Ex. 1) | Slightly stringy |
| Sample 7 (Ref. Ex. 2) | Slightly inferior shape retainability |
| Sample 8 (Ref. Ex. 3) | Smooth and excellent shape retainability |

As shown in Table 22, the dressing (Sample 5) prepared using the starch-blended preparation of Example 15 was smooth and excellent in shape retainability, as with the dressing (Sample 8) prepared using the processed starch (Reference Example 3) to be used in dressings. When using the unprocessed potato starch (Comparative Example 1) and the physically modified starch (Reference Example 2), the resulting dressings were stringy and inferior in shape retainability due to the disintegration of starch granules because of the shear caused by the colloid mill.

Formulation Example 3

(1) Preparation of Stirred-Type Yogurt

Using the starch products of Example 15, Comparative Example 1 and Reference Example 2, stirred-type yogurts were prepared according to the formulations shown in Table 23 (Samples 9 to 11).

TABLE 23

|  | Sample 9 | Sample 10 | Sample 11 |
|---|---|---|---|
| Starch-blended preparation (Ex. 15) | 1.05 parts | — | — |
| Potato starch (Comp. Ex. 1) | — | 1 part | — |
| Physically modified starch (Ref. Ex. 2) | — | — | 1 part |
| Whole milk powder | 2 parts | 2 parts | 2 parts |
| Defatted milk powder | 5 parts | 5 parts | 5 parts |
| Milk | 30 parts | 30 parts | 30 parts |
| Gelatin F3578 (produced by Jellice Co., Ltd.) | 0.6 parts | 0.6 parts | 0.6 parts |
| Total amount after adding water | 100 parts | 100 parts | 100 parts |
| Starter (Bulgaria Yogurt; produced by Meiji Dairies Corporation) (with respect to 100 parts of the above starting material milk) | 3 parts | 3 parts | 3 parts |

Preparation Method (1) Various kinds of ingredients are dispersed in water and milk while stirring.

(2) After heating at 70° C. for 10 minutes while stirring, the moisture content is adjusted.

(3) The mixture is homogenized with a homogenizer (150 Kgf/cm$^2$).

(4) The mixture is heated at 90° C. for 10 minutes while stirring.

(5) After cooling to 50° C. or less, a starter is mixed in an amount of 3 parts with respect to 100 parts of the milk starting material.

(6) The mixture is stored in a thermostat bath at 40° C.

(7) When the pH reaches 4.5, the mixture is cooled to 10° C. or less.

(8) Curd is crushed by a homomixer, and the resultant is placed in a container.

(2) Evaluation

The stirred-type yogurts obtained in the above manner were stored in a refrigerator (4° C.), and their state was evaluated 24 hours later. Table 24 shows the results.

TABLE 24

| | State of stirred-type yogurt |
|---|---|
| Sample 9 (Ex. 15) | Smooth and good shape retainability |
| Sample 10 (Comp. Ex. 1) | Watery and poor shape retainability |
| Sample 11 (Ref. Ex. 2) | Smooth and good shape retainability |

As shown in Table 24, the stirred-type yogurt (Sample 9) prepared using the starch preparation of Example 15 was smooth and excellent in shape retainability, as with the stirred-type yogurt (Sample 11) prepared using the physically modified starch (Reference Example 2) to be used in stirred-type yogurts for the purpose of texture improvement. Sample 10 prepared using the untreated potato starch (Comparative Example 1) was watery and inferior in shape retainability due to the disintegration of starch granules because of the shear caused by the homogenizer.

Formulation Example 4

(1) Preparation of Fruit Sauce

Using the starch products of Example 15, Comparative Example 1 and Reference Example 4, fruit sauces were prepared according to the formulations shown in Table 25 (Samples 12 to 14).

TABLE 25

| | Sample 12 | Sample 13 | Sample 14 |
|---|---|---|---|
| Starch-blended preparation (Ex. 15) | 3.03 parts | — | — |
| Potato starch (Comp. Ex. 1) | — | 3 parts | — |
| Processed starch (Ref. Ex. 4) | — | — | 3 parts |
| Sugar | 20 parts | 20 parts | 20 parts |
| 5 times-concentrated clear apple juice | 2 parts | 2 parts | 2 parts |
| Total amount after adding water | 100 parts | 100 parts | 100 parts |

Preparation Method (1) The starch-blended preparation, potato starch, or processed starch, and sugar are dispersed in water while stirring.
(2) After heating at 90° C. for 10 minutes while stirring, a fruit juice is added, and the moisture content is adjusted.
(3) After cooling to 20° C., the pH is adjusted to 3.6 with citric acid.
(4) The resultant is placed in an aluminum laminate pouch, and the pouch is heated in a hot bath at 85° C. for 20 minutes.
(5) The pouch is cooled in running water.

(2) Evaluation

The fruit sauces obtained in the above manner were stored at room temperature, and their state was evaluated 24 hours later. Table 26 shows the results.

TABLE 26

| | State of fruit sauce |
|---|---|
| Sample 12 (Ex. 15) | Not stringy and having body feeling |
| Sample 13 (Comp. Ex. 1) | Viscous but highly stringy |
| Sample 14 (Ref. Ex. 4) | Not stringy and having body feeling |

As shown in the above table, the fruit sauce (Sample 12) prepared using the starch preparation of Example 15 was smooth and excellent in shape retainability, as with the fruit sauce (Sample 14) prepared using the processed starch (Reference Example 4) to be used in fruit sauces. The unprocessed potato starch (Comparative Example 1) was stringy since starch granules disintegrated because of heating or the shear caused by stirring.

As is clear from the above formulation examples, the starch-blended preparation of the present invention is very effective as an alternative to the processed starch and physically modified starch that have been used for various applications.

The invention claimed is:

1. A method of modifying starch, comprising subjecting a powdery mixture consisting essentially of starch and water-soluble hemicellulose at a weight ratio of 95:5 to 80:20 to moist-heat treatment at 100 to 200° C.

2. The modification method according to claim 1, wherein the moist-heat treatment is a treatment to heat the powdery mixture of starch and water-soluble hemicellulose in a closed container at a relative humidity of 100% for 5 to 300 minutes.

3. The modification method according to claim 1, wherein the moist-heat treatment is a treatment to heat the powdery mixture of starch and water-soluble hemicellulose in an open container for 5 to 60 minutes wherein the amount of steam consumed during the treatment divided by the volume of the container is 50 g/L to 1 kg/L.

4. The modification method according to claim 1, wherein the starch is at least one member selected from the group consisting of potato starch, waxy potato starch, tapioca starch, glutinous rice starch, and waxy corn starch.

5. The modification method according to claim 1, wherein the starch is at least one member selected from the group consisting of tapioca starch, glutinous rice starch, and waxy corn starch; and the powdery mixture further contains an alkaline compound in addition to the starch and water-soluble hemicellulose.

6. The modification method according to claim 5, wherein the powdery mixture comprises 0.01 to 0.5 parts by mass of alkaline compound per 100 parts by mass of starch.

7. The modification method according to claim 6, wherein the alkaline compound is selected from the group consisting of:
  hydroxydes, carbonates, and hydrogen carbonates of alkali metals and alkaline earth metals; and
  alkali metal and alkaline earth metal salts of citric acid, tartaric acid, malic acid, succinic acid, gluconic acid, fumaric acid, acetic acid, and oxalic acid.

8. The modification method according to claim 1, wherein the heat treatment is conducted in an autoclave, a hybrid kiln, or an incubator.

9. A method of producing a starch-blended preparation, comprising the steps of:
  (1) mixing starch with water-soluble hemicellulose in powder form at a weight ratio of starch to water-soluble hemicellulose of 95:5 to 80:20 to obtain a powdery mixture consisting essentially of starch and water-soluble hemicellulose; and (2) subjecting the powdery mixture to moist-heat treatment at 100 to 200° C.

10. The production method according to claim 9, wherein the moist-heat treatment is a treatment to heat the powdery mixture of starch and water-soluble hemicellulose in a closed container at a relative humidity of 100% for 5 to 300 minutes.

11. The production method according to claim 9, wherein the moist-heat treatment is a treatment to heat the powdery mixture of starch and water-soluble hemicellulose in an open container for 5 to 60 minutes wherein the amount of steam consumed during the treatment divided by the volume of the container is 50 g/L to 1 kg/L.

12. The production method according to claim 9, wherein the starch is at least one member selected from the group consisting of potato starch, waxy potato starch, tapioca starch, and waxy corn starch.

13. The production method according to claim 9, wherein the starch is at least one member selected from the group consisting of tapioca starch, glutinous rice starch, and waxy corn starch; and the powdery mixture further contains an alkaline compound in addition to the starch and water-soluble hemicellulose.

14. The production method according to claim 13, wherein the powdery mixture comprises 0.01 to 0.5 parts by mass of alkaline compound per 100 parts by mass of starch.

15. The production method according to claim 14, wherein the alkaline compound is selected from the group consisting of:

hydroxydes, carbonates, and hydrogen carbonates of alkali metals and alkaline earth metals; and alkali metal and alkaline earth metal salts of citric acid, tartaric acid, malic acid, succinic acid, gluconic acid, fumaric acid, acetic acid, and oxalic acid.

16. A starch-blended preparation produced by the method according to claim 9.

17. A food product produced using the starch-blended preparation according to claim 16 as an ingredient.

18. The production method according to claim 9, wherein the heat treatment is conducted in an autoclave, a hybrid kiln, or an incubator.

* * * * *